US009512018B1

(12) United States Patent
Kolls et al.

(10) Patent No.: US 9,512,018 B1
(45) Date of Patent: Dec. 6, 2016

(54) SAFE CLEAN DRINKING WATER, THE WORLDWIDE CHALLENGE OF PREVENTING WATERBORNE ILLNESSES

(76) Inventors: H. Brock Kolls, Alpharetta, GA (US); Christine C. Kolls, Alpharetta, GA (US)

(*) Notice: Subject to any disclaimer, the term of this patent is extended or adjusted under 35 U.S.C. 154(b) by 853 days.

(21) Appl. No.: 13/550,634

(22) Filed: Jul. 17, 2012

Related U.S. Application Data

(60) Provisional application No. 61/510,825, filed on Jul. 22, 2011.

(51) Int. Cl.
*C02F 1/48* (2006.01)
*C02F 1/467* (2006.01)
*C02F 1/461* (2006.01)

(52) U.S. Cl.
CPC ............... *C02F 1/487* (2013.01); *C02F 1/467* (2013.01); *C02F 1/46104* (2013.01); *C02F 1/46109* (2013.01); *C02F 1/48* (2013.01); *C02F 2001/46171* (2013.01); *C02F 2201/46145* (2013.01)

(58) Field of Classification Search
CPC ......... C02F 1/005; C02F 1/008; C02F 1/4608; C02F 1/461; C02F 1/46104; C02F 1/46109; C02F 1/46114; C02F 1/4618; C02F 1/467; C02F 1/48; C02F 1/485; C02F 1/487; C02F 1/50; C02F 1/505; C02F 9/00; C02F 9/005; C02F 2001/46152; C02F 2001/46171; C02F 2001/46185; C02F 2201/46145
See application file for complete search history.

(56) References Cited

U.S. PATENT DOCUMENTS

| | | | | | |
|---|---|---|---|---|---|
| 4,552,664 | A | * | 11/1985 | Benner | 210/695 |
| 4,608,247 | A | | 8/1986 | Heinig, Jr. | |
| 4,719,018 | A | * | 1/1988 | Przybylski | 210/748.19 |
| 5,091,152 | A | * | 2/1992 | Thomas, Sr. | 204/228.6 |
| 5,783,090 | A | | 7/1998 | Gleen | |
| 6,217,892 | B1 | | 4/2001 | King | |
| 6,875,360 | B2 | * | 4/2005 | Allen et al. | 210/695 |
| 7,582,198 | B2 | | 9/2009 | Wilkins et al. | |
| 2006/0130481 | A1 | * | 6/2006 | Browe | 60/641.8 |
| 2009/0152207 | A1 | * | 6/2009 | Asokan | A61L 2/02 210/748.01 |
| 2010/0193359 | A1 | * | 8/2010 | Mierswa | 204/554 |

* cited by examiner

*Primary Examiner* — David C Mellon
(74) *Attorney, Agent, or Firm* — H. Brock Kolls

(57) ABSTRACT

The present invention relates to an improved treatment system for inactivating microorganisms. An ion control means generates ions and compensates for conductivity variations in a liquid medium surrounding a microorganism. This increases the microorganism susceptibility to inactivation, by way of an inactivation pulse. A high intensity pulse means used in combination with the ion control means, delivers the inactivation pulse. Exemplary embodiments include a field generator, which generates a field that encompasses the microorganism diminishing ability of the microorganism to regulate proper cellular function, and a pulse pattern switching means. The pulse pattern switching means repeatedly alternates between generating ions by way of the ion control means and delivering the inactivation pulse by way of the high intensity pulse means.

17 Claims, 8 Drawing Sheets

148
Flow
202A
136
162
118
154
202B
206
122
204A
210A
208
202D
208A
202E
H3O+
OH-
H+
O-
+H
-
212
154
204B
210B
208B
208
130B
-Cl
K+
NA+
214A
+/-
214B
134
132
202C
Flow
Flow

SAFE CLEAN DRINKING WATER, THE WORLDWIDE CHALLENGE OF PREVENTING WATERBORNE ILLNESSES

CROSS-REFERENCE TO RELATED APPLICATIONS

This application contains subject matter which is related to the subject matter of the following application. The below listed application is hereby incorporated herein by reference in its entirety:

This is a U.S. non-provisional application that claims the benefit of a U.S. provisional application, Ser. No. 61/510,825, inventor H. Brock Kolls et al., entitled "SAFE CLEAN DRINKING WATER, THE WORLDWIDE CHALLENGE OF PREVENTING WATERBORNE ILLNESSES", filed Jul. 22, 2011.

TECHNICAL FIELD OF THE INVENTION

This invention relates to an improved treatment system and method for inactivating microorganisms and particularly to a treatment system comprising an ion control means for generating ions, wherein ion generation can compensate for conductivity variations in a liquid medium surrounding a microorganism and increases the microorganism susceptibility to inactivation, by way of an inactivation pulse; and a high intensity pulse means utilized in combination with the ion control means, for delivering the inactivation pulse, inactivating the microorganism.

BACKGROUND OF THE INVENTION

Before our invention it was estimated that worldwide one out of every four deaths of children under the age of five was due to a water related disease. In addition, it was estimated that on average 1.4 million children die each year from waterborne diseases. Statistics indicated that as much as one half of the world's hospitalizations were due to water related diseases, and that only approximately 60% of the world's population had access to improved sanitation and clean water. It was also estimated that nearly one billion people were suffering needlessly and were without access to safe water. Furthermore, it was well documented that in many places in the world clean, safe drinking water is scarce or nonexistent all together.

According to WATER.ORG, the WORLD HEALTH ORGANIZATION, and others, more people in the world own a cell phone than have access to a toilet, which raises public health sanitation concerns. Furthermore, as cities and slums are expected to grow, the prediction is that the increasing rates of poor situation and hygiene are only going to get worse. Sanitation is a root cause of contaminated water sources and waterborne diseases. It is estimated that everyday the lack of access to clean water kills thousands of people. Even worse those people who don't die of their waterborne disease are often left with a reduced quality of life.

To get a better understanding of just how serious the problem of waterborne illness and a lack of safe clean drinking water really is, below is a partial list of some of the waterborne pathogens commonly found in unsanitary water environments. This list includes viral agents such as hepatitis A, and the noroviruse; parasitic agents such as *giardia lamblia, cryptosporidium*, and cyclosporiasis; and bacterial agents such as *escherichia coli* (*e. coli*), *salmonella, campylobacter, shingella*, and *vibrio cholerae.*

Though commonly found in unsanitary water conditions these and other pathogens can outbreak anytime and are often abundant at times of natural disaster and states of emergency, where a population of people are unprepared, and sanitation becomes a concern, such as during earthquakes, tsunamis, floods, tornadoes, and other types of disasters.

To this end, a shortcoming of current water treatment equipment can be that they only rely on membrane type filters to remove particulates and process unsanitary water sources. These types of system do not actively kill the microorganisms (viral, parasitic, and bacterial agents), which are often present in the unsanitary water. Instead, these treatment systems try to capture microorganisms in the filter membrane. This method often fails as many microorganisms are too small to be trapped in filter membranes. As such, often the pathogens simply pass through the filter membrane and remain in the processed water where they can cause illness.

Shortcomings of other treatment equipment can be that they add chemicals to try to treat the unsanitary water. This often results in discolored water or treated water with a chemical composition and odor. Furthermore, often the treated water then needs to be filtered again to try to remove the added chemicals, before the water can be used. Often when the chemical supply runs out they are not replaced and as a result the treatment equipment is often rendered ineffective.

Another shortcoming of existing water treatment systems can be cost, size, and complexity. It is just impractical to think that a high cost water treatment system, a water treatment system that is too big and not portable, or a water treatment system that involves a high level of complexity can be reliably deployed into developing countries or places of sudden disaster or state of emergency and be effective.

For these reasons and shortcomings as well as other reasons and shortcomings there is a long felt need that gives rise to the present invention.

SUMMARY OF THE INVENTION

The shortcomings of the prior art are overcome and additional advantages are provided through the provision of an improved treatment system for inactivating microorganisms comprising an ion control means for generating ions, wherein ion generation can compensate for conductivity variations in a liquid medium surrounding a microorganism and increases the microorganism susceptibility to inactivation, by way of an inactivation pulse; and a high intensity pulse means utilized in combination with the ion control means, for delivering the inactivation pulse, inactivating the microorganism.

Additional shortcomings of the prior art are overcome and additional advantages are provided through the provision of an improved treatment system for inactivating microorganisms comprising a field generator, which generates a field that encompasses a microorganism diminishing the ability of the microorganism to regulate proper cellular function; and a high intensity pulse means used in combination with the field generator, for delivering an inactivation pulse, inactivating the microorganism.

Additional shortcomings of the prior art are overcome and additional advantages are provided through the provision of an improved treatment method for inactivating microorganisms comprising generating ions, by way of an ion control means, wherein ion generation can compensate for conductivity variations in a liquid medium surrounding a microorganism and increases the microorganism susceptibility to inactivation, by an inactivation pulse; and delivering the inactivation pulse, inactivating the microorganism, by way of a high intensity pulse means.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
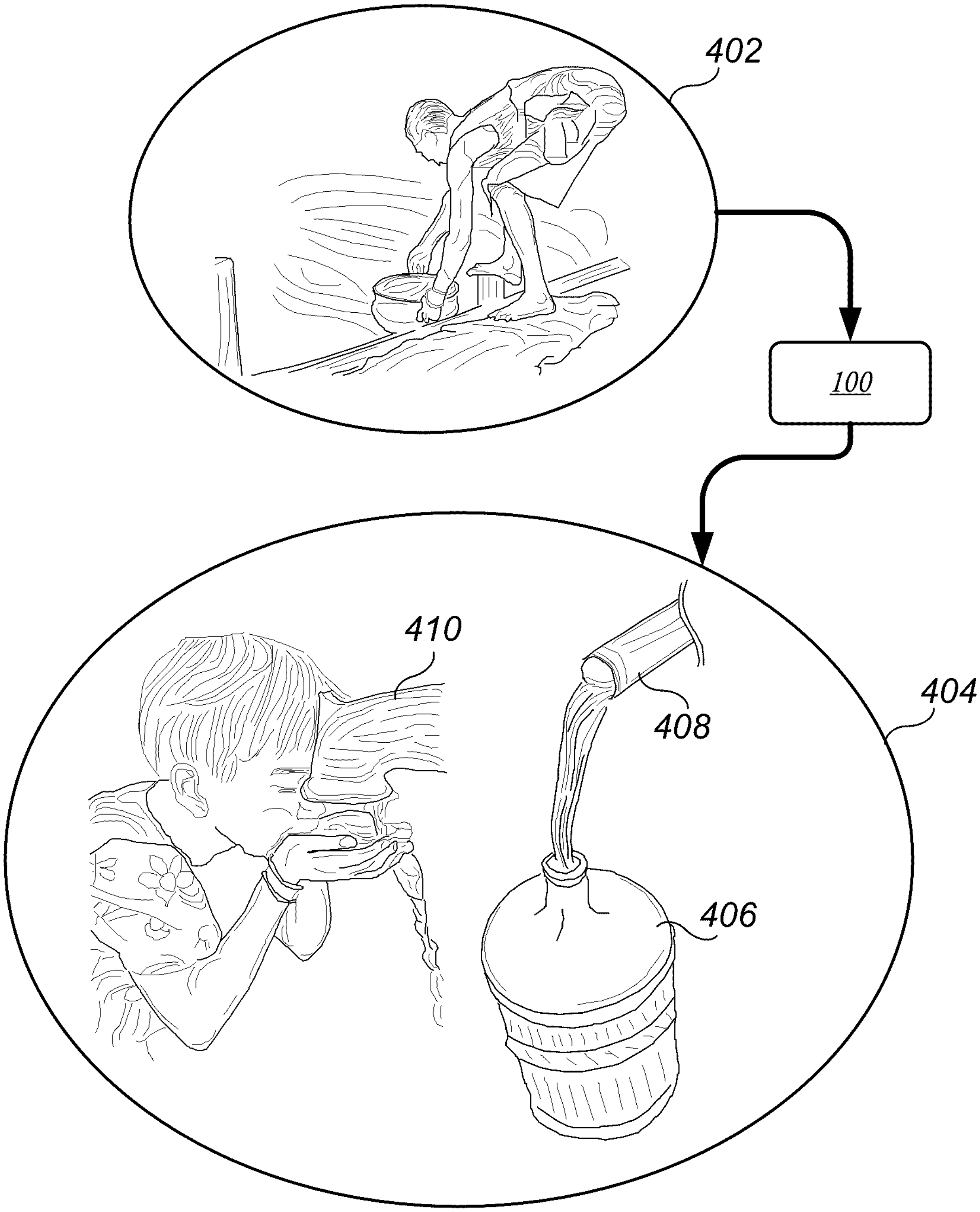
FIG. 1 illustrates one example of an improved treatment system for inactivating liquid medium borne microorganisms.

Turning now to the drawings in greater detail, it will be seen that in FIG. 1 there is illustrated one example of an improved treatment system 100 for inactivating liquid medium 154 borne microorganisms 208. Liquid medium 154 borne microorganisms 208 is not shown in FIG. 1 but is illustrated in at least FIG. 2. In an exemplary embodiment, source water 402 is often collected or otherwise obtained from unsanitary and or untreated water sources. For purposes of disclosure, such unsanitary and or untreated water can be referred to as liquid medium 154 and can contain waterborne microorganisms, pathogens, viruses, and other microorganisms that can and often do cause sickness and even death in humans if exposed or otherwise ingested. For purposes of disclosure microorganism, pathogens, viral agents, parasitic agents, bacteria agents and or other agents and microorganisms can be referred to as microorganism 208.

Use of the term 'microorganism', in the present invention, is defined as any microscopic organism including bacterium, viruses, protozoan, molds, single cell organism, multi-cell organisms, fungus, and any other organisms of microscopic size.

Use of the term 'source water', in the present invention, refers to sources of water such as rivers, lakes, streams, ponds, wells, municipal water sources and supplies, faucets in homes and businesses, and or other sources of water. In this context, 'source water' refers to any source of water.

In addition to untreated source water such as rivers, lakes, streams, ponds, wells, and or other sources of water, unsanitary and or untreated water can be delivered to households and businesses by way of municipal water distribution networks. These networks may have suspect water treatment practices and or from time to time become compromised, such as during floods, states of emergency, damage to the transfer pipes themselves, during maintenance, or at other times and under other circumstances.

Use of the term 'liquid medium', or 'medium', in the present invention, refers to liquids, or a combination of liquids, gases, and or solid particulates thereof that surround the microorganism to be inactivated and is desired to be safely consumed or used. Such 'liquid medium' can include, for example and not a limitation, water, products comprising water or coconut water, products comprising tea, products comprising juice, products comprising coffee, products comprising milk, and or other liquid medium products, as may be required and or desired in a particular embodiment.

In an exemplary embodiment of the present invention, liquid medium 154 including water can be collected and or otherwise provided from a source 402 and processed by the treatment system 100 to be rendered safe for consumption or use without risk 404. In this regard, the treatment system 100 inactivates the microorganisms 208 that can be contained within the liquid medium 154 and can provide other water filtering and processing, as may be required and or desired in a particular embodiment. For disclosure purposes reference 402 can be referred to as unsanitary water 402 or unsafe water 402 and reference 404 can be referred to as safe water 404.

In an exemplary embodiment, liquid medium 154 can include source water, tea, juice, coffee, milk, coconut water, or other liquid medium. Such liquid medium 154 can be obtained manually, through distribution networks, or otherwise and can be processed by treatment system 100. The treated liquid medium 154 can then be used on demand at a point of use, or stored in a vessel 406. In practice, an individual may collect the water from a river or stream, collect milk from cows or goats, and or make tea or juice or coffee, process the liquid medium 154 with the treatment system 100 of the present invention, and then use on demand at a point of use or store the processed liquid medium 154 in a vessel 406.

Alternatively, the liquid medium 154, such as source water, may be processed by the treatment system 100 of the present invention and then be provided by a municipality or other means through a well 408, water supply 410, or delivered by other methods to an end consumer, as may be required and or desired in a particular embodiment.

An advantage of the present invention is that to reduce the risk of waterborne illnesses and to better insure that potentially dangerous microorganisms are killed or otherwise inactivated, before the source water is consumed or used, the treatment system 100 can be utilized to process the source water to inactivate microorganism 208, that may be present in the source water. For disclosure purposes, source water can be referred to as liquid medium 154.

In general, the liquid medium 154 can be processed with the treatment system 100 to inactivate microorganisms, which may be present, and can also be used to filter the liquid medium 154 removing particulates, chemicals, metals, odors, off-flavors, and other undesirable particulates and or materials from the liquid medium 154.

Figure 2:
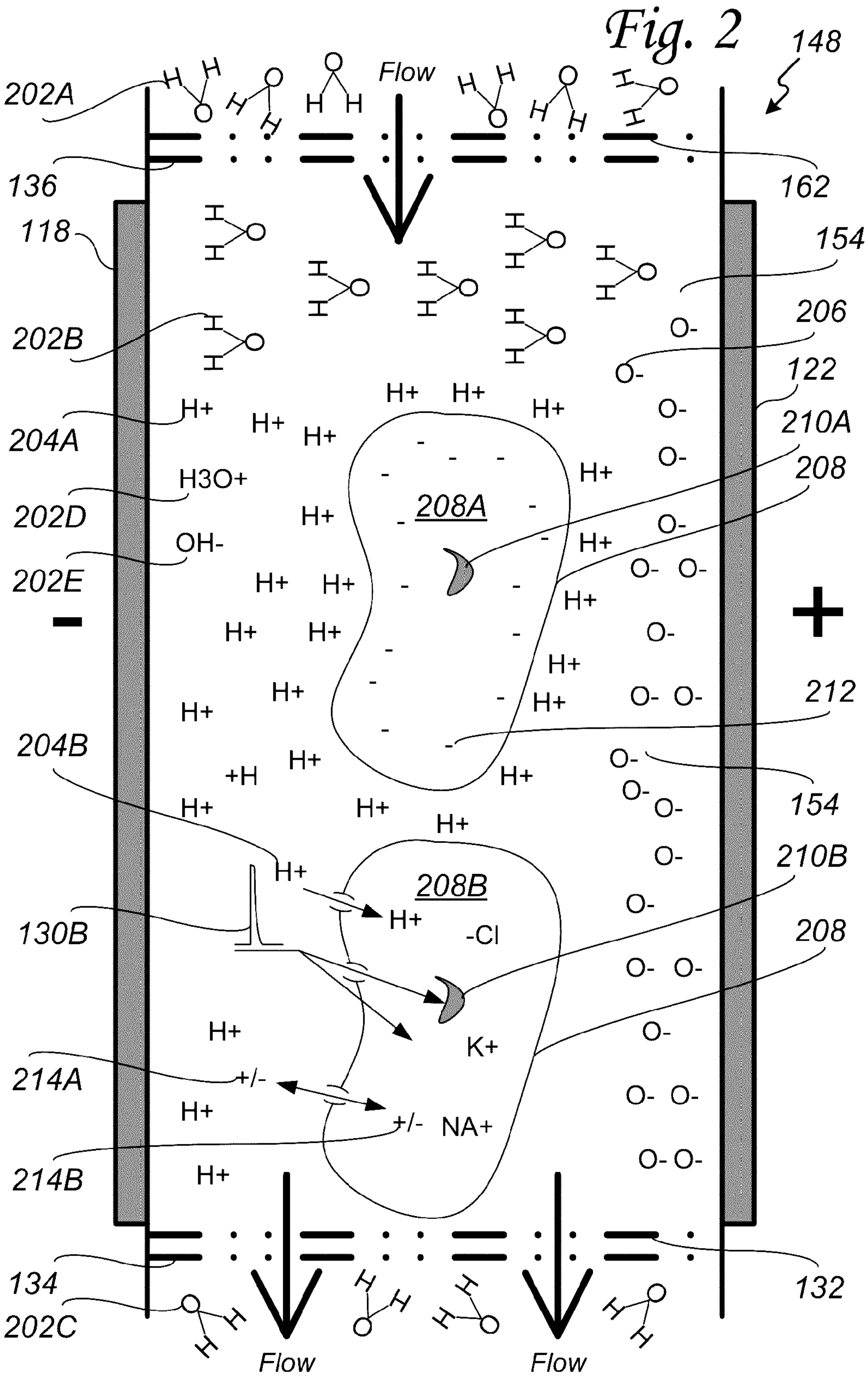
FIG. 2 illustrates one example of a treatment chamber which comprises a microorganism.

Referring to FIG. 2 there is illustrated one example of a treatment chamber 148, which comprises a microorganism 208 in a liquid medium 154. For disclosure purposes the microorganism 208 is also referenced in FIG. 2 as 208A and 208B in order to be able distinguish between the two illustrations when referencing the Figure with the detailed description below.

In an exemplary embodiment, a treatment chamber 148 receives the microorganism 208 and the liquid medium 154 surrounding the microorganism 208, and is operationally coupled to the ion control means 114 and the high intensity pulse means 102. Furthermore, the liquid medium 154 can flow into the treatment chamber 148 through particulate filters 162 and special purpose filter 136. Filters 132, 134, 136, and 162 can contain magnetic material or, if one of more filter is not needed for filtering, can be a magnet. In this regard, the filters 132, 134, 136, and 162 can be configured to function in the capacity of the field generator 158 providing a magnetic field, by which proper cellular function of within the microorganism 208 can be disrupted, making it easier to inactivate the microorganism 208 with an inactivation pulse 130B.

In an exemplary embodiment special purpose filter 136 can be an ion exchange resin based filter, an electrolyte providing filter, an active carbon based filter, or other special purpose filter, or a combination thereof designed to prepare the liquid medium 154 for treatment, as may be required and or desired in a particular embodiment.

In a similar manner, as the liquid medium egresses out of the treatment chamber 148 a special purpose filter 132 can filter and or polish the treated liquid medium 154. This can include neutralizing, by removing, any excess ions that may be present in the treated liquid medium 154, as a result of the treatment process. In addition, this can include providing an ion exchange resin based filter, an electrolyte providing filter, an active carbon based filter, or providing other special purpose filters designed to filter, polish, and or otherwise prepare the treated liquid medium 154 for consumption or use, as may be required and or desired in a particular embodiment. A filter 134 can also be provided to refine, polish or otherwise filter the treated liquid medium 154 exiting the treatment chamber 148, as needed.

In an exemplary embodiment, the treatment chamber 148 receives the microorganism 208, also referenced in FIG. 2 as microorganism 208A and 208B, and the liquid medium 154 surrounding the microorganism 208. The treatment chamber 148 can be operationally coupled to the ion control means 114 and the high intensity pulse means 102, not shown in FIG. 2 but illustrated in at least FIG. 10. The treatment chamber 148 can comprise anode electrode 122 and cathode electrode 118. These electrodes 118 and 122 can be configured as parallel surfaces, rod inside of tube style treatment chamber, as illustrated in at least FIGS. 8 and 9, or can be configured in other geometries, as may be required and or desired in a particular embodiment. In this regard, for purposes of disclosure, the electrodes 118 and 122 of at least FIG. 2 illustrates several electrode configurations including parallel plates, rod inside of tube, and other configurations having an anode and a cathode electrode. In general, the liquid medium 154 needs to be introduced between the surfaces of electrodes 118 and 122 for treatment.

Figure 10:
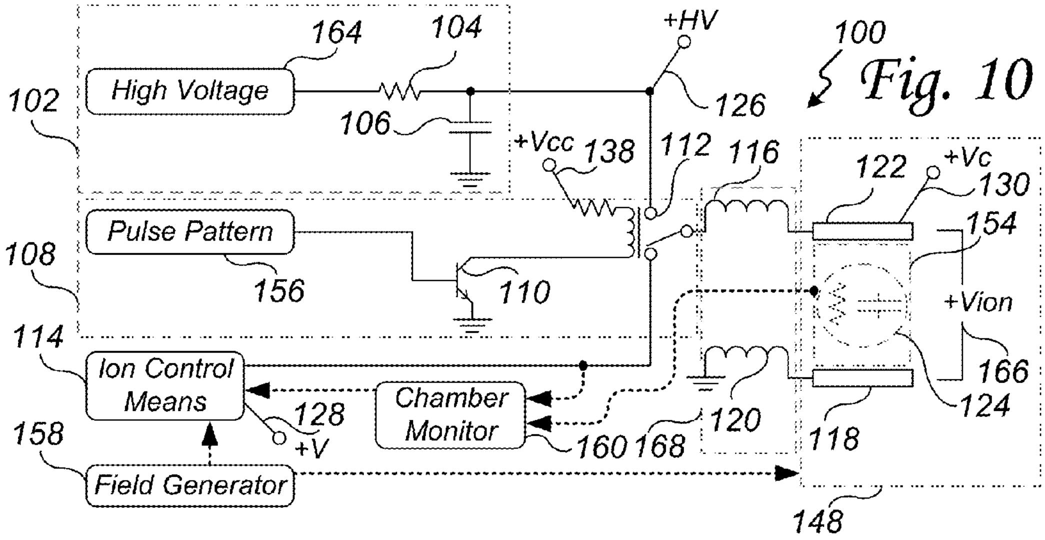
FIG. 10 illustrates one example of a functional block schematic of a treatment system.

As illustrated in at least FIG. 2, as the liquid medium 154 comprising water molecules 202A are introduced into the treatment chamber 148 between electrodes 118 and 122 a field generated by field generator 158, illustrated in at least FIG. 10, which can either be an electric field, magnetic field, other field, or a combination of an electric field and a magnetic field, encompass the microorganism 208 diminishing the ability of the microorganism 208 to regulate proper cellular function. The field can also orientate liquid medium 154 water molecules 202B, and or fracture the water molecules. In this regard, the ion control means 114, illustrated in at least FIG. 10, exploits the self ionization properties of water through a carefully controlled treatment cycle waveform 128, which is illustrated further in at least FIG. 11. The ion control means 114 can fracture, through electrolysis, some of the water molecules forming hydrogen H+ ions illustrated as 204A and oxygen O− ions illustrated as 206. For disclosure purposes oxygen ions O− can interchangeably be represented as O− and or O2−.

With regards to the field generator 158, in an exemplary embodiment, a high intensity pulse means 102 can be used in combination with the field generator 158, for delivering an inactivation pulse, inactivating the microorganism 208.

Figure 11:
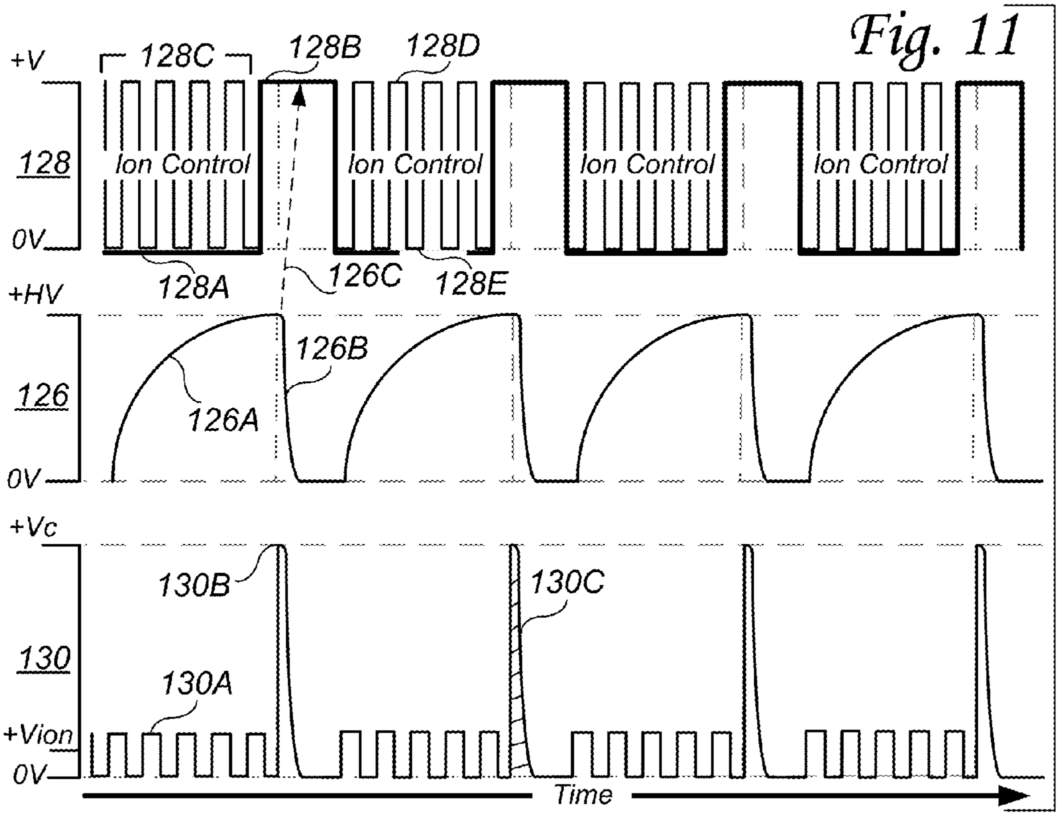
FIG. 11 illustrates one example of treatment system waveforms.

In addition, the encoded ion control waveform 128C, illustrated in at least FIG. 11, promotes self ionization, which produces hydronium ions H3O+ referenced as 202D and hydroxide ions OH− referenced as 202E. The promotion of self ionization of the liquid medium 154 can have the effect of changing the conductivity the liquid medium 154, making it easier to transfer electrons between electrodes 118 and 122, which in turn can enhance the ability to inactivate microorganism 208, by way of an inactivation pulse 130B.

Within the liquid medium 154 can be microorganism 208, referenced in at least FIG. 2 as 208A and 208B. The microorganism 208 can be a single-cell or multi-cell organism and can include, for example and not limitations, bacterium, molds, fungus, cysts, viruses, or other single-cell or multi-cell organisms, all of which can be referred to as microorganism 208 or microorganisms 208. In addition, microorganism 208 may have internal structures, organelle, or other types and or kinds of internal structures illustrated as 210A and 210B. The internal structure though varying between different types of microorganisms 208 is mentioned here because at least one of the inactivation methods disclosed involves damaging the internal structure 210A-B with the inactivation pulse 130B. In this regard, the inactivation pulse 130B can be utilized to irreversible damage the internal structure 210A-B of the microorganism 208 and thus inactivate the microorganism 208. For disclosure purposes, organelle, internal structure 210A and 210B can be referred to as internal structure 210.

Use of the term 'Ph', in the present invention, refers to a numerical figure expressing the acidity or alkalinity of the liquid medium 154, on a logarithmic scale, of which the numerical figure '7' is neutral, lower values are more acid, and higher values are more alkaline.

Microorganism 208 tend to have a net negative charge illustrated as minus sign 212, as such with the formation of hydrogen H+ ions during treatment, some of the hydrogen H+ ions are attracted to the outer protective cellular membrane of the microorganism 208, as illustrated by the plurality of H+ ions surrounding the outer cellular membrane of microorganism 208A. This effect coupled with the fact that the formation of hydrogen H+ and oxygen O− ions has the effect of changing the pH of the liquid medium 154, which in turn can cause the microorganism 208 to try to regulate the internal microorganism 208 pH by opening protein channels and other channels in the protective outer cellular membrane can places the microorganism 208 under stress and make the microorganism 208 more vulnerable to inactivation.

In this regard, when the microorganism 208 opens channels in the cellular membrane the microorganism 208 is exposed to at least one method of microorganism 208 inactivation. Referring to the microorganism referenced as 208B, as the microorganism 208B opens channels in the protective cellular membrane to try to regulate pH, between the internal pH of the microorganism 208B and the pH of the external liquid medium 154, an inactivation pulse 130B can cause uncontrolled ion transport across the protective cellular membrane. This is illustrated in at least FIG. 2 as an uncontrollable breech of the cellular membrane due in part to the inactivation pulse 130B, which is illustrated as part of the treatment chamber waveform 130B, wherein hydrogen H+ ion 204B and other ions 214A and 214B internal and external to the microorganism 208B uncontrollably can cross the protective cellular membrane.

Use of the term 'potable water', in the present invention, is defined as water of sufficiently high quality that it can be consumed or used without risk of immediate or long term harm.

Use of the term 'electrolysis', in the present invention, is defined as chemical decomposition produced by passing an electric current through a liquid or solution containing ions.

Use of the term 'electroporation', in the present invention, is defined as the application of electric pulses to increase the permeability of cell membranes.

Use of the term 'organelle', in the present invention, is defined as any number of organized or specialized structures within a living cell.

Use of the term 'inactivation', in the present invention, is defined as microorganism death or sufficient irreversible damage to the microorganism, as to prevent the microorganism from surviving, reproducing, and or causing illness if the liquid medium 154 containing the microorganism is consumed or used.

Utilizing electroporation techniques in combination with other methods and techniques of the present invention, can cause uncontrolled ion transport across the cellular membrane, this in turn can cause several irreversible conditions to occur, within the microorganism 208, leading to the inactivation of the microorganism 208. One such inactivation method can be the formation of hydrogen peroxide H2O2, which when formed within the microorganism 208, inactivates the microorganism 208 almost immediately. A second inactivation method can be the uncontrolled combining of molecules and ions, within the microorganism 208, which causes an irreversible condition, wherein the microorganism 208 cannot regulate pH or salinity and swells by ingesting liquid medium 154 until the microorganism 208 bursts and thus is inactivated.

In an exemplary embodiment, another microorganism 208 inactivation method can be caused by the inactivation pulse 130B illustrated in at least FIGS. 2 and 11. In this regard, whether the inactivation pulse 130B breeches the protective cellular membrane by exploiting an already opened channel resultant from the prior mentioned treatment steps or by way of the inactivation pulse 130B having sufficient specific energy to breech the intact unopened protective cellular membrane of the microorganism 208, the inactivation pulse 130B can cause irreversible damage to the internal structure of the microorganism 208 resulting in microorganism 208 inactivation. The concept of specific energy is disclosed more fully below and the specific energy of the inactivation pulse 130B, referenced above, is illustrated as inactivation pulse 130B with specific energy 130C in at least FIG. 11.

Referring to FIG. 2, after microorganism 208 inactivation treatment, the liquid medium 154, containing the inactivated microorganism 208, illustrated as H2O 202C, can then exit the treatment chamber 148 as potable liquid medium 154. Filters 132 and 134, as previously disclosed, can finish the filtration processes, remove any undesirable ions or other molecular byproduct substances created during or remaining after the treatment process, restore the pH of the liquid medium 154, and or provide other filtering or polishing of other properties of the liquid medium 154, as may be required and or desired in a particular embodiment.

As such, in an exemplary embodiment of the present invention, a treatment system 100, for inactivating microorganisms 208, can comprise an ion control means 114 for generating ions, which can compensate for conductivity variations in a liquid medium 154 surrounding a microorganism 208 and increases the microorganism 208 susceptibility to inactivation, by way of an inactivation pulse 130B; and a high intensity pulse means 102 utilized in combination with the ion control means 114, for delivering the inactivation pulse 130B, of sufficient specific energy 130C, inactivating the microorganism 208.

The treatment system 100 can further comprise a field generator 158, which generates a field that encompasses the microorganism 208 diminishing the ability of the microorganism 208 to regulate proper cellular function. In an exemplary embodiment, a field generator, which generates a field that encompasses the microorganism diminishing the ability of the microorganism to regulate proper cellular function.

The treatment system 100 can further comprise a pulse pattern switching means 108, illustrated in at least FIG. 10, for creating a treatment cycle, which comprises repeatedly alternating between generating ions, by way of the ion control means 114 and delivering the inactivation pulse 130B, by way of the high intensity pulse means 102. In an exemplary embodiment, a pulse pattern switching means can create a treatment cycle, the treatment cycle comprising repeatedly alternating between generating ions, by way of the ion control means, and delivering the inactivation pulse, by way of the high intensity pulse means.

The treatment system can further comprise an intensifier 168 operationally coupled between a treatment chamber 148 and at least the ion control means 114, wherein the intensifier 168 intensifies ion generation. In an exemplary embodiment, the intensifier 168 can comprise inductors 116 and 120 configured to intensify at least the ion generation portion of the treatment cycle.

Use of the term "log reduction" is defined as a mathematical term used to show the relative number of live microbes eliminated from the liquid medium. For example a '5-log reduction' means lowering the number of microorganisms by 100,000-fold, that is, if the liquid medium had 100,000 pathogenic microbes in it, a '5-log reduction' would reduce the number of microorganisms to one.

Figure 3A:
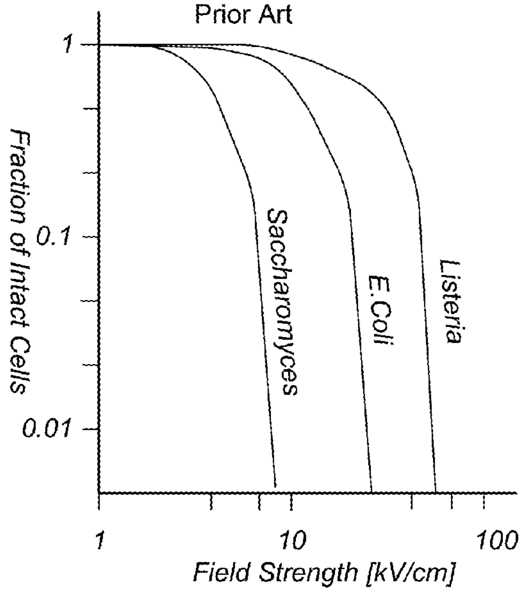
FIGS. 3A-3D illustrate quantitative relationships of field strength, specific energy, ion generation, and treatment cycles.

Referring to FIGS. 3A-3D there is illustrated quantitative relationships of field strength, specific energy, ion generation, and treatment cycles. In this regard, field strength, often measured in kilovolts per centimeter (kV/cm), which is necessary to inactivate cells, has been conducted in numerous research studies. A prior art graph that summarizes the 'field strength' necessary to inactivate certain pathogens is illustrated in FIG. 3A. This chart indicates generally that the greater the 'field strength' the more likely the pathogen cells will be inactivated. In the present invention, a 'field strength' greater than 10 kV/cm can be necessary to initiate meaningful cellular inactivation and a 'field strength' approaching 100 kV/cm or more is preferred to insure inactivation of most species of microbes. Noting here that microorganism 208 can be a single-cell or multi-cell organism.

Figure 3B:
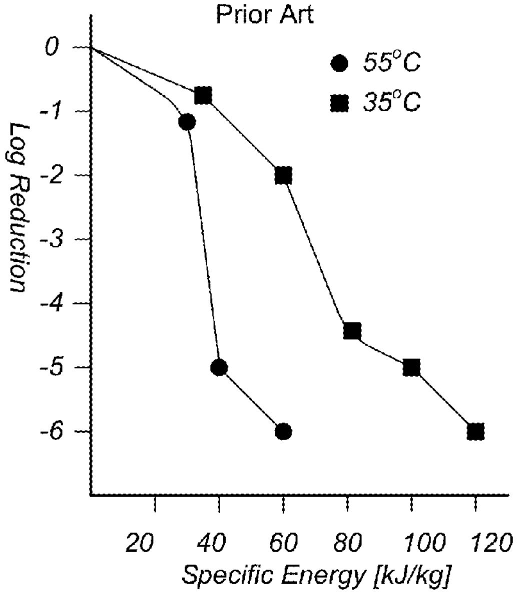

In addition to field strength, another important parameter to consider is 'specific energy', often measured in kilo-Joules per kilogram {kJ/kg). As with field strength, there have been numerous research studies which have sought to characterize log reduction versus 'specific energy'. The prior art chart of FIG. 3B summarizes some of these research findings and indicates that liquid medium temperature and 'specific energy' of an inactivation pulse necessary to inactivate a cell are related. In this regard, the cooler the liquid medium temperature surrounding the microorganism the more 'specific energy' is needed in the form of an inactivation pulse 130B to achieve a larger log reduction. In an exemplary embodiment of the present invention, a 'specific energy' greater than 60 kJ/kg can be necessary to initiate meaningful cellular inactivation (log reduction of 5 or 6 in warm to hot liquid medium) and a 'specific energy' approaching 100 kJ/kg or more is preferred to insure sufficient log reduction inactivating most species of microbes. Again noting that microorganism 208 can be a single-cell or multi-cell organism.

In an exemplary embodiment, the inactivation pulse has minimum specific energy of 60 kJ/kg and minimum field strength of 10 kV/cm.

An advantage in the present invention is that as energy is transferred to the liquid medium 154 during treatment by way of at least treatment waveform 130, which comprises the ion generation period and the inactivation pulse period, the liquid medium 154 and the microorganism 208, within the liquid medium 154, warms making it easier to inactivate the microorganism 208. In this regard, the longer the energy from the treatment waveform 130 is applied to the liquid medium 154 the warmer the liquid medium 154 and the microorganism 208, within the liquid medium, gets. Correspondingly, referring to the chart of FIG. 3B the warmer the liquid medium 154 the less amount of specific energy is required to inactivate the microorganism 208.

Figure 4:
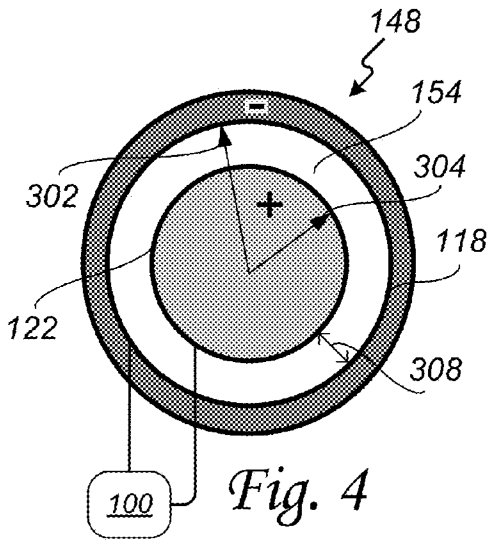
FIGS. 4-9 illustrate examples of a treatment chamber.
Figure 8:
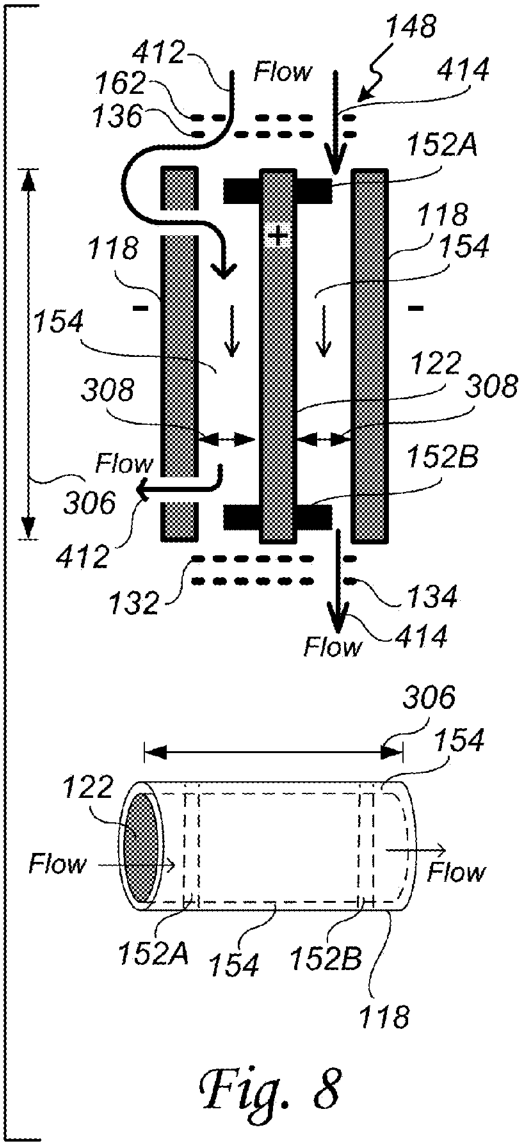
Figure 9:
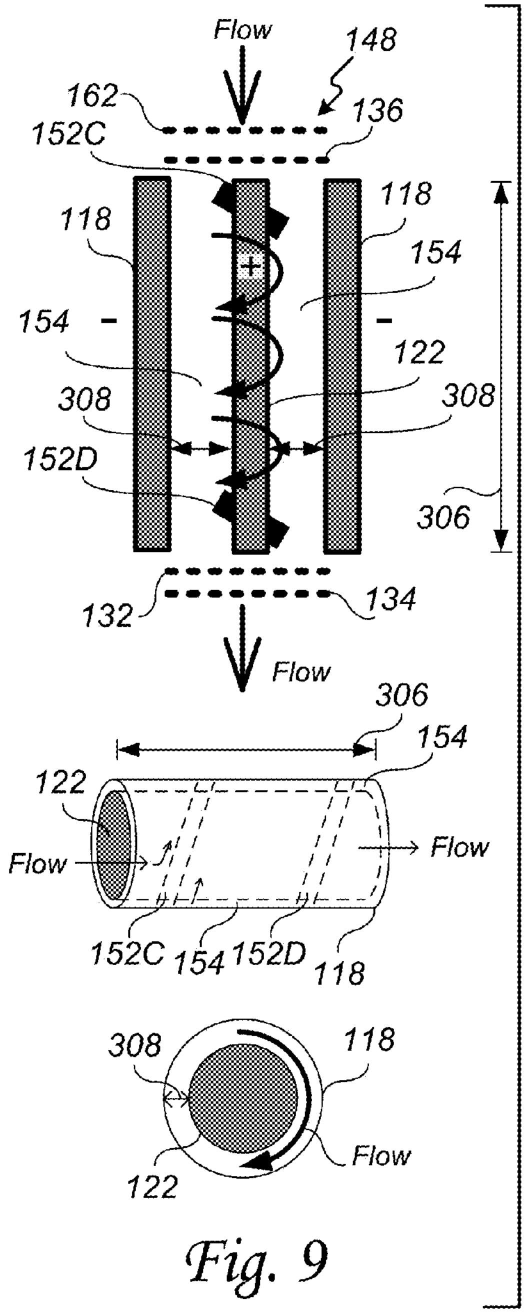

In an exemplary embodiment of the present invention, the specific energy of the inactivation pulse 130B may be characterized in a variety of ways or methods. At least one such way or method to characterize the specific energy, in the present invention, can be as follows:

$$\mu = \frac{kJ}{kg}$$

Wherein 'μ' is the specific energy, 'kJ' is kilo-Joules, and 'kg' is kilogram mass of the liquid medium 154 between the electrodes 118 and 122. If the treatment chamber 148 is configured as a rod inside a tube, as illustrated in at least FIGS. 8 and 9 the above characterization can be transformed to better characterize this specific treatment chamber 148 configuration. In this regard, at least one such way or method to better characterize the specific energy, as it relates to a tube and rod geometry treatment chamber can be as follows:

$$\mu = \frac{Vc^2 SL\pi[Rout^2 - Rin^2]}{\sigma Rchamber}$$

Wherein 'Vc' is the field strength voltage of the inactivation pulse 130B generated by the high intensity pulse means 102, 'S' is the duration of the inactivation pulse 130B, 1' is the length of the treatment chamber 306, as illustrated in at least FIGS. 8 and 9, 'Rout' is the inner radius 302 of the tube 118, as illustrated in at least FIG. 4, 'Rin' is the outer radius 304 of the rod 122, as illustrated in at least FIG. 4, 'Rchamber' is the resistance of the liquid medium 154, within the chamber 148, and 'σ' is the density of the liquid medium 154 in kilograms per meter cubed ($kg/m^3$).

For purposes of disclosure electrode 118 can be referred to as tube 118 and electrode 122 can be referred to as rod 122. In this regard, tube 118 and rod 122 are electrically connected and can be used as electrodes during operation.

In an exemplary embodiment of the present invention, 'Rchamber' can and does vary based on the type, kind, and temperature of liquid medium 154 in the treatment chamber 148. In this regard, not only does the type and kind of liquid medium 154 influence the resistance and conductance of the treatment chamber 148, but so does the electrolytes and ion content within the liquid medium 154. Better performance in inactivating microorganism 208 is achieved when the resistance and conductance of the liquid medium 154 allows easy passage of electric current through the liquid medium 154 when it is between the electrodes 118 and 122.

To minimize the variance of resistance and therefore improve the conductance of the liquid medium 154 and to reduce the need to add electrolytes or ion creating materials to the treatment system, such as sodium chloride NaCl, for example and not a limitation, the ion control means 114, of the present invention, can be configured to provide an ion control waveform 128C. In this regard, the ion control waveform 128C can be configured to exploit the self ionization features of water molecules H2O, within the liquid medium 154, and to change the conductance of the liquid medium 154. This can have the effect of stabilizing 'Rchamber' variations between different types and kinds of liquid medium 154, and enhancing the treatment system 100 ability to inactivate microorganisms 208. Such ion control waveform 128C is further disclosed in at least FIG. 11.

In an exemplary embodiment, for example and not a limitation, when you compare the conductance of distilled water versus saline water, the observation shows that the saline water conducts electric current better than distilled water. This is primarily due to the additional ions within the saline water. Water naturally exhibits a certain amount of self ionization so the distilled water does conduct electric current but just not as easily as saline water. To promote the flow of electric current in the distilled water the self ionization aspects need to be increased, in order to change the conductance of the water, increasing the distilled water ability to pass electric current. To accomplish this, the ion control means 114 can be utilized to create an ion control waveform illustrated as ion control waveform 128C in at least FIG. 11. In this regard, the self ionization aspects of the distilled water can be increased, which can improve the conductance of the water allowing the water to pass electric current easier. This in turn makes the microorganism 208 more susceptible to the inactivation pulse 130B, as more specific energy from the inactivation pulse is delivered to the microorganism 208.

By controlling the ion control waveform 128C 'Rchamber' can be better controlled across a wider variety of liquid medium 154. In this regard, for example and not a limitation, distilled water and saline water can be brought closer to a similar conductance level so that log reduction between the different water types is more predictable. By controlling ion generation and enhancing self ionization, to control medium conductance variations, the amount of specific energy delivered to the microorganism 208 can be better predicted and as a result a higher log reduction of inactivated microorganisms 208 can be achieved across a wider variety of similar liquid medium 154 types or kinds.

Figure 3C:
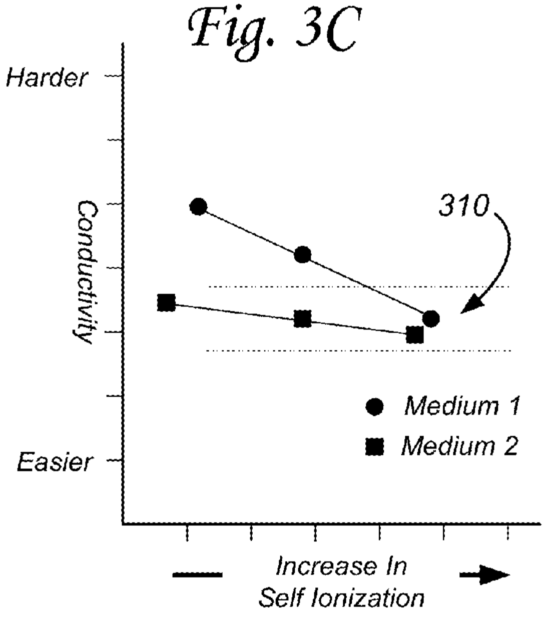

In an exemplary embodiment, FIG. 3C illustrates a conductance region 310 that is preferred when applying the treatment cycles, to better insure that any microorganisms contained within the liquid medium 154 are sufficiently inactivated. In this regard, from a conductivity perspective, the easier electric current passes through the liquid medium the more effective the inactivation pulse 130B will be in inactivating the microorganism 208. The chart in FIG. 3C compares 'medium 1', which initially has a harder time passing electric current with a 'medium 2', which as illustrated has an easier time passing electric current. Though 'medium 2' starts in the preferred conductance region 310 and requires minimal to no increase in self ionization to insure the specific energy of the inactivation pulse 130B is sufficient to inactivate microorganism 208, 'medium 1' starting position is not as optimal. As such, ion control means 114 and ion control waveform 128C can be utilized to increase the self ionization capabilities of 'medium 1', changing the conductivity of 'medium 1', making it easier to pass electric current, and thus shifting 'medium 1' into the preferred conductance region 310, where treatment to inactivate the microorganism 208 is more effective producing a greater log reduction.

Figure 3D:
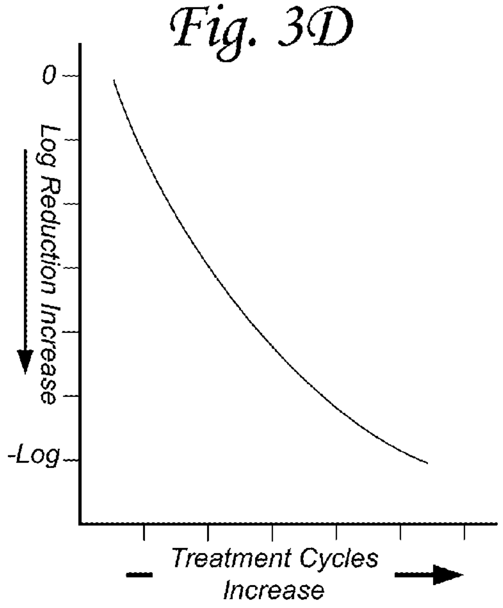

Referring to FIG. 3D there is illustrated a curve that indicates as the number of treatment cycles on the liquid medium 154 sample increases, the log reduction increases. In this regard, in an exemplary embodiment, a single treatment cycle can comprise generating ions, by way of the ion control means 114, and delivering the inactivation pulse 130B, by way of the high intensity pulse means 102. This treatment cycle is illustrated in at least FIG. 11, which shows generating ions, by way of the ion control means 114, during the period of 128A and delivering the inactivation pulse 130B, by way of the high intensity pulse means 102, during treatment cycle period 128B. Noted is that, in an exemplary embodiment, the ion control waveform 128C can be encoded into at least a portion of the treatment cycle period 128A, and or other portion of the treatment cycle, as may be required and or desired in a particular embodiment. Also noted is that FIG. 11 illustrates a time domain long enough to show four such treatment cycles. In an exemplary embodiment, treatment cycles can repeat continually and controlling liquid medium 154 flow rate through the treatment chamber 148 can better insure a desired number of treatment cycles are delivered to each segment of liquid medium 154 and thus to each of the microorganisms 208 contained in the liquid medium 154.

In an exemplary embodiment, this treatment cycle pattern of period 128A and 128B, with encoded ion control waveform 128C, can be repeated to form a repetitive pattern of treatment cycles. This repetitive treatment cycle pattern can be utilized to generate a treatment cycle waveform 128 and in part a treatment chamber waveform 130 which can be used to treat the liquid medium 154 that is in the treatment chamber 148. The treatment chamber waveform 130 can comprise an ion generation component and an inactivation pulse component. In addition, as previously mentioned, the liquid medium 154 flow rate can be adjusted to deliver at least a predetermined number of treatment cycles, at a minimum ion threshold voltage +Vion 166, to better insure the desired log reduction of inactivated microorganisms 208 is achieved.

Furthermore, the treatment chamber waveform can be applied to the treatment chamber 148, such that the liquid medium 154 containing the microorganism 208 is subjected to numerous treatment cycles. In a plurality of embodiments, depending on the liquid medium 154 and other treatment system 100 design parameters, the treatment system 100 can deliver 1 to 250 or more treatment cycles per sample of liquid medium 154, to better insure the desired log reduction of inactivated microorganisms 208 is achieved.

Though in theory a single inactivation pulse 130B, carefully designed, having sufficient field strength and specific energy is all that is need to inactivate a microorganism 208, in practice variations in the electrodes 118 and 122 surface and configuration, particulates in the liquid medium 154, that may temporarily hide the microorganism 208 from the full effect of the inactivation pulse 130B, orientation of the microorganism 208 to the electric or magnetic field, as well as orientation to the inactivation pulse 130B, ion concentration levels, and numerous other factors all necessitate some reasonable repetitive number of treatment cycles to insure the desired log reduction is achieved.

The treatment system 100 can further comprise a pulse pattern switching means 108, for creating a treatment cycle 128, which comprises repeatedly alternating between generating ions, by way of the ion control means 114 and delivering the inactivation pulse 130B, by way of the high intensity pulse means 102. A pulse pattern generator 156, a driver 110, a switch 112, as well as other functional components can be integrated together and operationally related to and with the pulse pattern switching means 108. In addition, the pulse pattern switching means 108, pulse pattern generator 156, driver 110, switch 112, intensifier 168, treatment chamber 148, and or other functional aspects of the treatment system 100 can be operationally related to deliver the treatment chamber waveform 130, as may be required and or desired in a particular embodiment.

As a summary of FIGS. 3A-3D, in an exemplary embodiment, the present invention utilizes ion generation and ion control waveforms to change the pH, temperature, and adjust the conductivity of the liquid medium 154 containing the microorganism 208. In this regard, this places stress on the microorganism 208, making the microorganism 208 more susceptible to inactivation, by way of the inactivation pulse 130B. The treatment system 100 then delivers an inactivation pulse 130B of sufficient field strength and specific energy to inactivate the microorganism 208. To insure desired log reduction results are achieved, the treatment cycles, which comprises repeatedly alternating between generating ions, by way of the ion control means 114, and delivering the inactivation pulse 130B, by way of the high intensity pulse means 102, is repeated numerous times on each sample of liquid medium 154. The treatment cycle time should be matched to the flow rate through the treatment chamber 148 so that the process can be continuous and on average each sample or segment of the liquid medium 154 receives the prescribed and or desired number of treatment cycles to insure the desired log reduction of inactivate microorganisms is achieved.

Referring to FIGS. 4-9 there is illustrated examples of a treatment chamber 148. FIG. 4 illustrates an end view of a rod 122 and tube 118, which together form a treatment chamber 148. In this regard, in an exemplary embodiment, a solid rod 122 can be placed inside a hollow tube 118. The tube 118 and the rod 122 can be made of metal, stainless steel, graphite, or other conductive material, as may be required and or desired in a particular embodiment. Care needs to be given to not only the selection of electrode materials but also to which materials will be utilized as the anode and the cathode.

In this regard, depending on the treatment system 100, the treatment chamber 148 configuration, and in particular on the configuration of the ion control means 114 and high intensity pulse means, the anode electrode 122 and cathode electrodes 118 may be subject to oxidization and reduction reactions, giving up molecules to or taking molecules from the liquid medium 154. Care needs to be taken as to what molecular interactions may be present, as a result of liquid medium 154 treatment, and to what byproducts, if any, may be formed in the treated liquid medium 154. Byproduct generation should be minimized or avoided all together if possible. If byproduct removal is required, post treatment filters 132 and 134 can be configured to provide the necessary byproduct removal system from the liquid medium 154 including polishing the treated liquid medium 154, adjusting the pH of liquid medium 154, and or provide other filtering, as may be required and or desired in a particular embodiment. In most embodiments, oxidization and reduction reactions can be modeled with electrolysis stoichiometry equations and should be viewed as a critical design factor.

When the rod 122 in placed inside the tube 118 a treatment chamber 148 is formed between the outer surface of the rod 122 and the inner surface of the tube 118. The rod 122 being solid forces the liquid medium though the treatment chamber 148 formed between the inner tube 118 surface and the outer rod 122 surface. Selecting the radius of the rod 122 and tube 118 carefully creates a treatment chamber 148 of fixed width 308.

In an exemplary embodiment, the treatment chamber 148 is operationally coupled to at least the ion control means 114 and the high intensity pulse means 102 as to facilitate treatment of the liquid medium 154 as it passes through the treatment chamber 148 in a continuous or semi-continuous batch manner. In a plurality of other embodiments, batch and continuous methods of liquid medium 154 treatments can be implemented and other treatment chamber 148 geometries can be used, as may be required and or desired in a particular embodiment.

Figure 5:
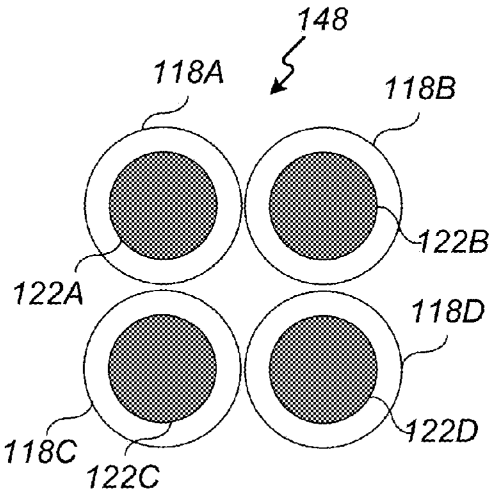
Figure 6:
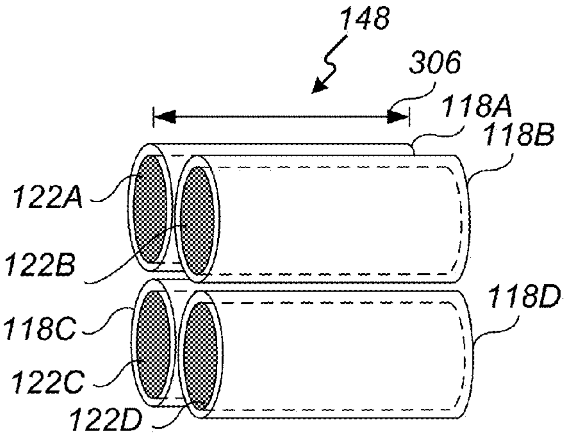

Referring to FIGS. 5-6 there is illustrated how a plurality of individual tubes 118A-D and individual rods 122A-D can form a plurality of treatment chambers that can be combined to create a single treatment chamber 148 to increase the volume of treated liquid medium 154 and, as such, increase the flow rate of the treated liquid medium 154. FIG. 5 illustrates an end view and FIG. 6 illustrates a side view. Of note is that design criteria for a tube and rod treatment chamber 148 not only includes carefully determining at least the inner radius of the tube 302, the outer radius of the rod 304, as illustrated in at least FIG. 4, but also includes carefully selecting the length 306 of the tube 118 and rod 122 assembly. In this regard, the treatment cycle frequency, length of the treatment chamber 148, and sample volume of liquid medium 154 that can be treated at one time in the treatment chamber 148 cooperate to determine the flow rate and also are factors in calculating the field strength and specific energy of the inactivation pulse to achieve the desired log reduction of inactivate microorganisms 208.

Figure 7:
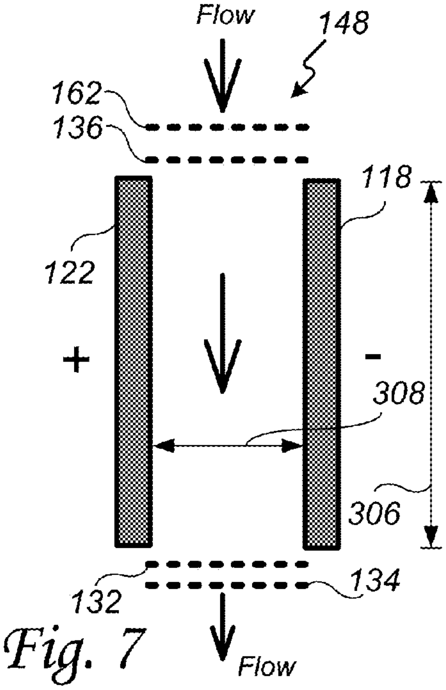

As an example and not a limitation, referring to FIG. 7, in an exemplary embodiment a volume of liquid medium 154, within the tube and rod treatment chamber 148, may be characterized in a variety of ways or methods. At least one such way or method to characterize this volume, in the present invention, can be as follows:

$$\mathrm{Vol}=[A\mathrm{tube}-A\mathrm{rod}]L$$

Wherein the volume 'Vol' within the treatment chamber is the cross sectional area inside the tube 'Atube' minus the cross sectional area of the rod 122 'Arod' times the length 'L' 306 of the treatment chamber 148. At least one such way or method to further characterize this volume can be as follows:

$$\mathrm{Vol}=L\pi[R\mathrm{out}^2-R\mathrm{in}^2]$$

Wherein 'Rout' in the inner radius of the tube 118 measurement 302 and 'Rin' is the radius of the outer surface of the rod 122 measurement 304.

With the volume of the treatment chamber determined, the mass of the liquid medium 154, within the treatment chamber 148, can be characterized in a variety of ways or methods. At least one such way or method to characterize the mass of the liquid, in the present invention, can be as follows:

$$Mmedium=\frac{\sigma}{Vol}$$

Wherein 'Mmedium' is the mass of the liquid medium 154 and 'σ' is the density of the liquid medium often measured in kilograms per meter cubed (kg/m$^3$). At least one such way or method to further characterize mass of the liquid medium 154 in the treatment chamber 148, in the present invention, can be as follows:

$$Mmedium=\frac{\sigma}{L\pi[Rout^2-Rin^2]}$$

With the design parameters of the treatment chamber determined, the field strength can be characterized. The field strength can be characterized in a variety of ways or methods. At least one such way or method to characterize the field strength also referred to as the electric field potential across the treatment chamber, in the present invention, can be as follows:

$$FieldStrength=\frac{\mathrm{kV}}{\mathrm{cm}}=\frac{\mathrm{kV}}{[Rout-Rin]}$$

Wherein electric field potential measured in kilo-volt 'kV' and distance across the treatment chamber measured in centimeters 'cm'. Reference can be made to the chart of FIG. 3A to gauge if the calculated field strength is sufficient to obtain the desired level of microorganism 208 inactivation. If not design parameters need to be changed and the field strength recalculated. In a similar manner, as previously disclosed, the specific energy can also be characterized and compared to the chart of FIG. 3B to gauge if the specific energy 130C of the applied inactivation pulse 130B will be sufficient to obtain the desired microorganism 208 inactivation log reduction. If not design parameters need to be changed. Noting here that the curves of FIG. 3C liquid medium 154 conductivity and FIG. 3D number of treatment cycles per sample of liquid medium 154 must also be considered and carefully chosen to have an effective treatment system 100, which meets or exceed the desired design requirements.

Though design steps and or configuration characterizations have been disclosed, for a tube-rod treatment chamber 148, this is an example and not a limitation of the present invention. In this regard, a similar design analysis can be implemented with a parallel plate treatment chamber, or any other geometry treatment chamber. Noting here that the characterizations above will change based on the geometry of the treatment chamber electrodes. As such, the theory presented, in the present invention, supports varied geometry treatment chambers 148.

Use of the term "mark" or "space" or "mark-to-space ratio" is an electronics term that is defined as the ratio of the duration of the positive-amplitude part of a wave to that of the negative-amplitude part of a wave. In this regard, the "mark" corresponds to the positive-amplitude portion of the wave, and the "space" corresponds to the negative-amplitude portion of the wave.

A caveat in the design analysis and an advantage in the present invention is the appreciation of the role conductivity plays in the overall effectiveness of the treatment and ultimately the achievable log reduction in inactivated microorganisms 208. Particular attention needs to be made to the ion control means 114 and the attributes of the ion control waveform 128C and resultant treatment chamber waveform 130A. The attribute characteristics of the ion control waveform 128C and resultant treatment chamber waveform 130A includes frequency, wave shape, amplitude, electric current supply, mark duration or period 128D, space duration or period 128E illustrated in at least FIG. 11, and or other attributes that should be carefully controlled to improve self ionization within the liquid medium 154 and as such improve conductivity, making electric current pass more easily through the liquid medium 154. Conductivity of the liquid medium 154 should be well understood when optimizing design parameters and settings. Ideally measured directly or indirectly during treatment. The treatment cycle characteristics should be varied to better insure conductivity of the liquid medium 154 is within the conductivity region 310, as illustrated in at least the chart of FIG. 3C, when applying the treatment cycles, to better insure that any microorganisms 208 contained within the liquid medium 154 are sufficiently inactivated.

If it is determined that control of the liquid medium 154 conductivity, within the region 310, as illustrated in at least FIG. 3C, cannot be achieved then electrolytes and or other ions may need to be added to the liquid medium 154, such as by way of specialty filter 136, or other methods. Adding the right kind and amount of electrolytes and or other ions to the liquid medium 154 will improve conductivity making it easier for electric current to pass through the liquid medium 154; however such added substances may add cost, require refill, impact negatively consumer attributes of liquid medium 154 such as taste, clarity, odor, or other attributes, need to be removed by post treatment filters or methods, and or cause other less than desirable design tradeoff considerations.

Referring to FIG. 8 there is shown a cross sectional view of a tube 118 and rod 122 assembly configured as treatment chamber 148. In an exemplary embodiment, liquid medium 154 passes through the treatment chamber 148, on the outside surface of the rod 122, between the inner surface of the tube 118 and the outer surface of the rod 122. To position the rod 122 inside the tube, insulated spacers 152A and 152B can be positioned, as needed to electrically isolate the rod 122 from the tube 118 and to maintain at a uniform and equidistance 308 the rod 122 from the inner surface of the tube 118. Equidistant spacing between the rod 122 outer surface, and tube 118 inner surface better insures even and consistent treatment energy being applied along the length 306 of the treatment chamber.

With respect to flow paths through the treatment chamber 148, for example and not a limitation, there are two different and mutually exclusive flow paths illustrated in at least FIG. 8. The purpose of FIG. 8 is to provide some understanding as to have in different embodiment liquid medium 154 can be routed to and through the treatment chamber 148. Either, both, or some combination thereof of both flow paths 412 and 414 can be implemented, as may be required and or desired in a particular embodiment.

One flow path 412 is shown passing through the filters and entering and exiting the treatment chamber through the sides of the tube 118 thus avoiding the insulated spacers 152A and 152B. This flow path 412 is preferred when avoidance of the insulated spacers 152A and 152B is desired and works well for gravity fed flow systems.

A second flow path 414 is shown passing through the filters and entering and exiting the ends of the treatment chamber 148 past the spacers 152A and 152B. This flow path 414 is preferred when it is desirable for spacers 152A and 152B to regulate the flow rate and or direct flow through the treatment chamber, as illustrated in at least FIG. 9. It is also preferred when the spacers 152A and 152B are such, as to not overly impede the liquid medium 154 flow through the chamber 148. In this configuration it can then become advantageous to couple tubing to at least one end of the treatment chamber 148 to route the liquid medium 154 to, through, and away from the chamber 148.

If the insulated spacers 152A and 152B are in the liquid medium 154 flow pathway, the spacers 152A and 152B must not completely abate the flow of liquid medium 154 through the chamber, rather the insulated spacers 152A and 152B need to secure in place the rod 122, while allowing liquid medium 154 flow through the treatment chamber 148. In a plurality of embodiments, any number of insulated spacers can be utilized, as may be required and or desired in a particular embodiment. Noted is that a key attribute of the insulated spacers 152A and 152B is to exhibit high dielectric or insulating properties, as to avoid creating a low resistance pathway or short between the anode and cathode, which is formed by the rod 122 and tube 118. As such, in operation the insulators 152A and 152B role is to position evenly the surface of the rod 122 from the tube 118 inner walls to form a uniform treatment chamber 148 and to insulate from electrical shorts occurring between the anode and cathode formed by the rod and tube surfaces.

Referring to FIG. 9 there is contrasted the perpendicular to the flow of liquid medium 154, insulated spacers 152A and 152B shown in FIG. 8, with the angled to the flow of liquid medium 154, insulated spacers 152C and 152D shown in FIG. 9. In an exemplary embodiment, the insulated spacers 152C and 152D, in addition to positioning and insulating rod 122, within the tube 118, can also be utilized to direct the liquid medium 154 flow through the treatment chamber. In this regard, by causing circular flow of the liquid medium 154 through the treatment chamber 148 the path can be lengthened, which enables more treatment cycles to be delivered to the liquid medium 154 in a shorted length 306 of treatment chamber 148. In addition, the microorganism 208 can be agitated causing the microorganism 208 to be repositioned and exposed in different orientations to the treatment cycle energy, which better insures microorganism 208 inactivation.

Referring to FIG. 10 there is illustrated one example of a functional block schematic of the treatment system 100. In an exemplary embodiment, for example and not a limitation, the treatment system 100 can comprise a high intensity pulse means 102 shown outlined in FIG. 10. The high intensity pulse means 102 can further comprise a high voltage generator 164 suitable to produce a high voltage potential of sufficient voltage and electric current to repetitively generate the inactivation pulse 130B. In this regard, at least once per treatment cycle, of sufficient field strength and specific energy is preferred to achieve the desired log reduction of inactivated microorganisms 208. The high voltage generator 164 can utilize a flyback transformer design, voltage multiplier design, a combination of both, or other high voltage generator techniques, as may be required and or desired in a particular embodiment.

Consideration in the high voltage generator 164 design should be given to how the design will influence high voltage +HV 126 charge time, as ultimately treatment cycle frequency can be negatively impacted with a slow charge time. In addition, this can translate into lower flow rates through the treatment chamber 148, as more time is needed to insure the desired numbers of treatment cycles are applied to the liquid medium 154 to better insure the desired log reduction of inactivated microorganisms 208 is achieved.

To store the generated high voltage +HV 126 charge from the high voltage generator 164, a charging resistor 104 and charging capacitor 106 can be selected. The high voltage +HV 126 increases over time, the rate of which is based on a number of factors including the configuration of the high voltage generator 164, the charging resistor 104, charging capacitor 106, and other factors. In operation, the high voltage +HV waveform 126 is illustrated in at lease FIG. 11 as high voltage +HV charge waveform 126A. When the inactivation pulse 130B is delivered to the liquid medium 154 containing microorganism 208 the high voltage +HV 126A is discharged. In operation, the +HV discharge waveform 126B. In an exemplary embodiment the high voltage +HV waveform 126 can repetitively occur at least once each treatment cycle.

The actual value of high voltage +HV 126, which in turn is the high voltage necessary to achieve the desired inactivated microorganism 208 log reduction, is guided by a number of design criteria. In this regard, the treatment chamber 148 design, the type of microorganisms 208 being inactivated, and the desired log reduction are three such design criteria. Furthermore, electrodes 118 and 122 material, separation, and surface area, as well as the liquid medium 154 and the temperature and conductivity of the liquid medium 154, as well as other factors, are all contributing factors that can influence the high voltage +HV 126 necessary to achieve the desired inactivated microorganisms 208 log reduction.

In an exemplary embodiment, informed by the charts of FIGS. 3A-3D and the characterization equations previously disclosed, high voltage +HV 126 is selected to generate an inactivation pulse 130B having a minimum field strength of 10 kV/cm across the treatment chamber and with a minimum specific energy of 60 kJ/kg. The higher the field strength and specific energy the better, with the caveat that too high a high voltage +HV 126 can create plasma streamers or electrical arcs across the treatment chamber 148 or treatment electrical circuit, which defeats the purpose and has a negative impact on treatment system 100 performance. Unnecessarily too high a high voltage +HV 126 can also cause premature degradation of the electrodes 118 and or 122.

In an exemplary embodiment, for example and not a limitation, the treatment system 100 can comprise a pulse pattern switching means 108 shown outlined in at least FIG. 10. The pulse pattern switching means 108 can further comprise a pulse pattern generator 156 capable of producing a treatment cycle waveform 128. Encoded within the treatment cycle waveform 128 there can be a period of time for generating ions, by way of the ion control means 114, and a period of time for delivering the inactivation pulse 130B. In an exemplary embodiment, the treatment system 100 can further comprise a driver 110, a switch 112, and other functional components, as required, for creating a treatment cycle 128, which comprises repeatedly alternating between generating ions, by way of the ion control means 114, and delivering the inactivation pulse 130B, by way of the high intensity pulse means 102.

In this exemplary embodiment, illustrated in at least FIG. 11, treatment cycle waveform 128, from the pulse pattern switching means 108, shows a trough or space portion 128A, which can correspond to a period of time for generating ions, by way of the ion control means 114, and a peak or mark portion 128B, which can correspond to a period of time for delivering the inactivation pulse 130B. The combination trough 128A and peak 128B form the treatment cycle waveform 128 and repeatedly alternating between these troughs and peaks form a plurality of treatment cycles. Such a treatment cycle can be implemented with a microcontroller, crystals, oscillators, timing integrated circuits such as clocks, flip-flops, or other waveform forming generating devices, as may be required and or desired in a particular embodiment. The frequency of the treatment cycles can vary from a few hertz to a few hundred hertz or higher, as may be required in a particular embodiment, and is largely gated by the length of time it takes for the high voltage +HV to charge capacitor 106, the time required to promote increased self ionization of the liquid medium 154, and other factors. The treatment cycle waveform 128 is illustrated, in at least FIG. 11, as treatment cycle waveform 128.

Noted here is the fact that transition time periods of the switching circuit, which comprises driver 110 and switch 112, can vary from embodiment to embodiment based on component selection, device operating parameters, methods implemented, and other factors. As such variations in waveform patterns can vary with these and other design choices and implementation methods. The waveforms of at least FIG. 11 are intended to be an illustrative example and not a limitation, of an exemplary embodiment of the present invention.

In an exemplary embodiment, driver 110 can utilize the waveform from the pulse pattern generator 156, which can be operationally related to the pulse pattern switching means 108 to drive a switch 112. In this regard, the driver 110 can provide level shifting between voltage levels, drive load bearing electrical components, and or control other functional components and aspects, as may be required and or desired in a particular embodiment. If the switch 112 is a metal-oxide semiconductor field effect transistor (MOSFET) or other field effect transistor (FET) device which requires a second MOSFET or other FET device to act as a driver to insure accurate switching, then driver 110 can be a MOSFET, FET, or other device to provide the interface necessary to control switch 112. If switch 112 is a relay type device then driver 110 can be a transistor based driver or other similar type or kind of device. In general, driver 110 provides the interface between the pulse pattern generator 156 and the switch 112, as required in a particular embodiment. In some embodiments, driver 110 may not be necessary at all and the pulse pattern generator 156 may be able to driver the switch 112 directly.

In an exemplary embodiment, the switch 112 provides an operationally related connection between the treatment chamber 148 and the ion control means 114 and or the high intensity pulse means 102. Switching can occur in accordance with the functions of the pulse pattern switching means 108, which generates a treatment cycle waveform 128. The treatment cycle waveform 128 can comprise repeatedly alternating between generating ions, by way of the ion control means 114 and delivering the inactivation pulse 130B, by way of the high intensity pulse means 102.

In an exemplary embodiment, depending on the peak amplitude of the high voltage +HV 126 and the frequency of the treatment cycles formed by waveform portions 128A and 128B, among other factors, switch 112 can be a relay, reed relay, or other type and kind of switch. Alternatively, switch 112 can be a MOSFET, FET, insulated gate bipolar transistor (IGBT), silicone controlled rectifier (SCR), triode alternating current switch (TRIAC), TRIGATRON, SPARK GAP SWITCH, or other type or kind of switch, as may be required and or desired in a particular embodiment.

Important design considerations for the pulse pattern switching means 108 can include sufficient transient protection from transients generated by the high voltage +HV 126 charge and discharge process, the inactivation pulse 130B, transients generated by the intensifier 168 and switch 112, transients from the ion control means 114, and other sparking or switching transients and noise. In addition, attention should be paid to the switching times. The switching times should be characterized by fast inactivation pulse 130B turn 'ON' and turn 'OFF' times, measured in the nanoseconds. The turn 'OFF' times can be influenced by the liquid medium 154, within the treatment chamber 148, and as such are often longer than the turn 'ON' time. If the inactivation pulse turn 'ON' time does not have a sharp rising leading edge and is fast, measured in the nanoseconds, the effectiveness of the inactivation pulse 130B may be reduced and as such the performance in log reduction of inactivate microorganisms 208 may be negatively impacted.

In an exemplary embodiment, an ion control means 114 can provide the necessary ion generation by way of an ion control waveform 128C, illustrated in at least FIG. 11. In this regard, frequency, wave shape, amplitude, electric current supply, mark period 128D, space period 128E, and other attributes can be carefully controlled to improve self ionization within the liquid medium 154 and as such improve conductivity of the liquid medium 154, by making electric current pass more easily through the liquid medium 154, as illustrated in at least the chart of FIG. 3C.

Furthermore, in an exemplary embodiment, the mark period 128D should be selected to have the waveform characteristics to fracture at least some of the water molecules into hydrogen H+ and oxygen O− ions. As such, the mark period 128D determines the electrolysis parameters and portion of ion control waveform 128C. Too much electrolysis produces gas bubbles, which can interfere with the inactivation pulse 130B. Too little electrolysis will not produce sufficient ions to change the pH of the liquid medium 154 surrounding the microorganisms 208, which can negatively impact the log reduction of inactivated microorganisms 208. The ion control voltage +V 128 is typically of a sufficient voltage amplitude and at a sufficient electric current level as to be able to maintain an ionization threshold voltage +Vion 166 differential across the treatment chamber 148, during the electrolysis mark period 128D of the ion control waveform 128C. The voltage level across the treatment chamber 148 can be characterized by the ionization threshold voltage +Vion 166, as illustrated in at least FIG. 11.

In an exemplary embodiment, +Vion 166 is the ionization threshold voltage and corresponds to the amplitude of the ion control waveform 130A applied to the liquid medium 154 treatment sample. In this regard, this voltage can be monitored by chamber monitor 160 or by other means, as may be required and or desired in a particular embodiment. The ionization threshold voltage +Vion 166 measurement above a certain ionization threshold voltage indicates that a sufficient electrical field across the treatment chamber 148 is being produced and therefore a corresponding and sufficient number of ions are being generated within the liquid medium 154. Alternatively, a +Vion 166 measurement below a certain ionization threshold voltage can indicate that a sufficient electrical field across the treatment chamber 148 is not being produced and therefore a corresponding and sufficient number of ions are not being generated within the liquid medium 154.

In the case that the ionization threshold voltage +Vion 166 measurement is below a certain ionization threshold one solution could be to slow the flow rate through the treatment chamber 148 allowing for increased self ionization of the liquid medium 154. In this regard, by allowing the ion control means 114 to increase self ionization of the liquid medium 154 and improve liquid medium 154 conductivity the ionization threshold voltage +Vion 166 should rise to meet or exceed the desired ionization threshold voltage.

The optimum ionization threshold voltage +Vion 166 can vary based on treatment chamber 148 design and other factors. In this regard, a minimum ionization threshold voltage +Vion 166 needs to be determined in a manner to best insure the desired log reduction is achieved across variations of liquid mediums 154. As an example and not a limitation, in the case of the liquid medium 154 being water this might include testing a variety of water types, such as a deionized water sources, pond water sources, and saline water sources to determine the optimum ionization threshold voltage +Vion 166.

Furthermore, in an exemplary embodiment, the space period 128E determines the amount of time dedicated to allowing the freshly fractured hydrogen H+ and oxygen O− ions to reassemble and promote self ionization, forming at least additional hydronium ions H3O+ and hydroxide ions OH−, each of which can improve the conductivity of the liquid medium 154 making electric current pass more easily through the liquid medium 154. This in turn improves the effectiveness of the inactivation pulse 130B, resulting in a better log reduction of inactivated microorganisms 208. In addition, this space period 128E also allows time for the hydrogen H+ ions to migrate to the mostly negatively charged microorganism 208 protective cellular membrane, which stresses the microorganism 208 and changes the pH of the liquid medium 154 surrounding the microorganism 208, all of which is a precursor to the delivery of the inactivation pulse 130B, which can cause uncontrolled ion transport across the cellular membrane inactivating the microorganism 208.

If the space period 128E is not provided in the ion control waveform 128C, in effect allowing the mark period 128D to extend the entire length of the ion control waveform 128C more electrolysis will occur. Though more hydrogen H+ and oxygen O− ions will be produced the continually applied mark period 128D will cause the ions produced to be pulled to the electrodes 118 and 122 faster resulting in promoting less self ionization. This will form less hydronium ions H3O+ and hydroxide ions OH− and result in less hydrogen H+ ions being attracted to the negatively charged microorganism 208; all of which can negatively impacting log reduction of inactivated microorganisms 208.

In an exemplary embodiment, conductivity of the liquid medium 154 should be well understood, ideally measured directly or indirectly during treatment, and the treatment cycle characteristics varied to better insure conductivity of the liquid medium 154 is within the conductivity region 310, as illustrated in at least FIG. 3C. These conditions are preferred when applying the treatment cycles to better insure that any microorganisms 208 contained within the liquid medium 154 are sufficiently inactivated.

In this regard, a chamber monitor 160 illustrated in at least FIG. 10 can be operationally coupled with the ion control means 114, the treatment chamber 148, and or operationally related to the treatment system 100 in other ways, as may be required and or desired in a particular embodiment, to determine directly or indirectly the conductivity of the liquid medium 154. One such method of monitoring conductivity of the liquid medium 154 indirectly can include measuring the ionization threshold voltage +Vion 166, as illustrated in at least FIG. 11, generated between the electrodes 118 and 122. In an exemplary embodiment, feedback from the measurements, direct or indirect, in a closed loop fashion, can be used to change the attributes and characteristics of the treatment system 100, and or the ion control waveform 128C including varying frequency, wave shape, amplitude, electric current supply, mark period 128D, space period 128E as illustrated in at least FIG. 11, and or other attributes and characteristics, as may be required and or desired in a particular embodiment, to maintain the desired treatment system 100 performance level.

In another exemplary embodiment, a chamber monitor 160 can monitor electric current flow through the treatment chamber 148 and or ionization threshold voltage +Vion 166 across the treatment chamber 148 and provide a feedback signal to make adjustments in the treatment method, if necessary, to stay within desired specifications. Alternatively, other chamber monitor 160 methods can be employed, as may be required and or desired in a particular embodiment.

In an exemplary embodiment, an intensifier 168 can be operationally coupled between the treatment chamber 148 and at least the ion control means 114, wherein the intensifier 168 intensifies ion generation. The intensifier 168 can be a matched pair of inductors 116 and 120, or other devices that when operated improve the efficiency of the treatment process. In this regard, one way in which the intensifier 168 intensifies ion generation is by operating the treatment chamber with intensifying inductors 116 and 120 at resonate frequencies with the treatment cycle waveform 128A and 128B and or ion control waveform 128C. Another way in which the intensifier 168 intensifies ion generation can be by storing energy during a portion of the waveform 128A, waveform 128B, and or ion control waveform 128C and then releasing the energy back into the treatment chamber 148 during other portions of the generated waveform 128.

In an exemplary embodiment, the treatment chamber 148 receives the microorganism 208 and the liquid medium 154 surrounding the microorganism 208, and is operationally coupled to the ion control means 114 and the high intensity pulse means 102. The treatment chamber 148 can comprise an anode electrode 122 and a cathode electrode 118. These electrodes 118 and 122 can be configured as parallel surfaces, rod-in-tube, or other geometries. In this regard, the electrodes 118 and 122 of at least FIG. 2 illustrate several electrode configurations including parallel plates, rod inside of tube as illustrated in at least FIGS. 8 and 9, and other geometries and configurations, as may be required and or desired in a particular embodiment. In general, the liquid medium 154 needs to be introduced between the surfaces of the electrodes 118 and 122 for treatment.

Depending on treatment system 100 configuration and in particular on the configuration of the ion control means 114 and high intensity pulse means 102, the anode electrode 122 and cathode electrodes 118 may be subject to oxidization and reduction reactions, giving up molecules to and or taking molecules from the liquid medium 154. Care needs to be taken as to what molecular interactions may be present as a result of liquid medium 154 treatment and to what byproducts, if any, may be formed in the treated liquid medium 154. Post treatment filters 132 and 134 may be able to provide the necessary removal system of byproducts, from the liquid medium 154, as well as adjust the pH of liquid medium 154. This behavior can be modeled better with electrolysis stoichiometry equations and can be a critical design factor.

In an exemplary embodiment, in operation, the liquid medium 154 exhibits both a resistance and a capacitance, noted as reference label 124 in at least FIG. 10. The resistance component 124 is inversely related to the conductance of the liquid medium 154 and it has been previously disclosed the role conductance of the liquid medium 154 plays in the overall performance of the treatment system 100. The capacitance component 124 of the liquid medium 154 can be capable of storing a charge and can enhance the ability to develop an electric field between the electrodes 118 and 122. In addition, the capacitance component 124, design of treatment chamber 148, the electrode 118 and 122 materials and geometry, the inductance and configuration of the intensifier 168, and other factor can combine to form a resistor-inductor-capacitor (RLC) resonator. The resonating effect can significantly improve the effectiveness of the treatments, even potentially allowing fewer treatment cycles, among other advantages, to obtain the desired log reduction of inactivated microorganisms 208.

In this regard, for treatment at resonance frequency selection of the ion control waveform 128C and the combination trough 128A and peak 128B forming a treatment cycle waveform 128 is important. At resonance, electric current through the chamber is reduced and energy contributions added to the treatment chamber can be cumulative, producing greater effectiveness of field strength, specific energy, inactivation pulse 130B, and other parameters, and as such render inactivation of microorganism 208 more effective and predictable.

In an exemplary embodiment, a field generator 158 generates a field which encompasses the microorganism 208 diminishing the ability of the microorganism 208 ability to regulate proper cellular function. In this regard, the field generated can be an electric field, a magnetic field, or other types and kinds of field, as may be required and or desired in a particular embodiment. The stronger the field generated the better. In operation, the field can cause electroporation of the microorganism 208. One of the effects on the microorganism 208 is that the microorganism 208 can loose the ability to regulate cellular function. Another effect is that protein channels and other channels, in the protective cellular membrane, of the microorganism 208, can open making it easier for uncontrolled ion transport to occur across the cellular membrane, when an inactivation pulse 130B is applied to the microorganism.

In an exemplary embodiment, the functional block schematic of the treatment system 100 illustrated in at least FIG. 10 shows at least two potential pathways for the field generator 158 to be operable in the treatment system 100. The first pathway can include combining the field generator 158 functionality with the ion control means 114 and creating an electric field across the treatment chamber 148 while the ion control waveform 128C is being applied to the treatment chamber 148. In this regard, the electric field should be as strong as possible, at least a couple volts of potential separation across the treatment chamber 148 to elicit microorganism 208 electroporation. The ionization threshold voltage +Vion 166 developed across the treatment chamber 148 can be measured to determine the effectiveness of this approach. The second pathway is through a magnetic field, orientated across the treatment chamber 148 and or in the pathway of liquid medium 154 flows into the treatment chamber 148. A strong magnetic field will also elicit microorganism 208 electroporation. A combination of both electric field and magnetic field can be implemented, though careful design and attention to field orientation and interactions need to be considered. Such a combination of electric field and magnetic field can increase the effectiveness of the treatment system 100.

Utilizing electroporation techniques, in the present invention, can cause uncontrolled ion transport across the cellular membrane, this in turn can promote several irreversible conditions to occur, within the microorganism 208, leading to inactivation of the microorganism 208. One such condition can be uncontrollable ion transport across the protective cellular membrane of the microorganism 208. This can cause the formation of hydrogen peroxide H2O2 within the microorganism 208. A condition which inactivates the microorganism 208 almost immediately.

A second condition can be the uncontrollable combining of ion, within the microorganism 208, which causes an irreversible condition where pH or salinity conditions cannot be satisfied or otherwise balanced by the microorganism 208 and as a result the microorganism 208 swells by ingesting liquid medium 154 until the microorganism 208 bursts and thus is inactivated.

A third microorganism 208 inactivation method can be caused by an inactivation pulse 130B. In this regard, whether the inactivation pulse 130B breeches the protective cellular membrane by exploiting an already open channel in the cellular membrane of the microorganism 208, resultant from the prior mentioned treatment steps or by way of an inactivation pulse 130B having sufficient specific energy 130C to breech the intact unopened protective cellular membrane of the microorganism 208, the inactivation pulse 130B can cause irreversible damage to the internal structure 210 of the microorganism 208 resulting in microorganism 208 inactivation.

Referring to FIG. 11 there is illustrated one example of treatment system 100 waveforms. In an exemplary embodiment, for example and not a limitation, with reference to the prior disclosure and functional block schematic illustrated in at least FIG. 10, FIG. 11 provides some reference waveforms at different test points, which include the ion control voltage +V 128, high the voltage +HV 126, the treatment chamber +Vc 130, and the ionization threshold voltage +Vion 166. Waveforms illustrated in FIG. 11 include at least the pulse pattern switching means 108 for creating a treatment cycle 128 and encoded with the ion control waveform 128C, the high voltage +HV 126 charge and discharge waveform, and the applied treatment chamber waveform 130. To better illustrate the relationship between the waveforms and with functional reference to FIG. 10 the waveforms are aligned and synchronized on the same time domain.

In an exemplary embodiment, a pulse pattern generator 156 can be operationally related to the pulse pattern switching means 108 and can be utilized to generate the treatment cycle waveform 128, and or to generate other waveforms, as may be required and or desired in a particular embodiment. Such waveforms can be generated by a microcontroller, integrated timing circuits such as clocks, flip-flops, and or other integrated circuits, generated by transistor or crystal oscillator circuits, and or other types and kinds of oscillators, or generated by other methods, as may be required and or desired in a particular embodiment.

Referring first to the pulse pattern switching means 108 for creating a treatment cycle waveform 128, which comprises repeatedly alternating between generating ions, by way of the ion control means 114 and delivering the inactivation pulse 130B, by way of the high intensity pulse means 102. In this regard, the treatment cycle generates ions by way of the ion control means 114, during the period of 128A and delivers the inactivation pulse 130B, by way of the high intensity pulse means 108, during treatment cycle period 128B.

In an exemplary embodiment, this treatment cycle pattern of period 128A and 128B with encoded ion control waveform 128C generated by the ion control means 114 can be repeated, to form a repetitive pattern of treatment cycles. This repetitive cycle can be applied to the treatment chamber 148 such that the liquid medium 154 containing the microorganism 208 is subjected to numerous treatment cycles. In a plurality of embodiments, depending on the liquid medium 154 and other treatment system design parameters, the treatment system 100 can deliver 1 to 250 or more treatment cycles per liquid medium 154 sample or segment, to better insure the desired log reduction of inactivated microorganisms 208 is achieved.

Though in theory a single inactivation pulse 130B carefully designed having sufficient field strength and specific energy is all that is needed to inactivate a microorganism 208, in practice variations in electrodes 118 and 122 surface and configuration, particulates in the liquid medium 154 that may temporarily hide the microorganism 208 from the inactivation pulse 130B, orientation of the microorganism 208 to the electric or magnetic field as well as the inactivation pulse 130B, ion concentration level, and numerous other factors all necessitate some reasonable repetitive number of treatment cycles to insure the desired log reduction is achieved.

A caveat in the design analysis needs to be the appreciation of the role conductivity plays in the overall effectiveness of the treatment and ultimately the log reduction achievable with inactivating microorganisms 208. Particular attention needs to be made to the ion control means 114 and the attributes of the ion control waveform 128C. The attribute characteristics of the ion control waveform 128C including frequency, wave shape, amplitude, electric current supply, mark duration or period 128D, space duration or period 128E, and or other attributes can be carefully controlled to improve self-ionization, within the liquid medium 154, and as such improve conductivity, by making electric current pass more easily through the liquid medium 154. Conductivity of the liquid medium 154 should be well understood, ideally measured directly or indirectly during treatment, and the treatment cycle characteristics varied to better insure conductivity of the liquid medium 154 is within the conductivity region 310, as illustrated in at least the chart of FIG. 3C, is preferred when applying the treatment cycles to better insure that any microorganism 208 contained within the liquid medium 154 is sufficiently inactivated.

Furthermore, in an exemplary embodiment, the mark period 128D should be selected to have the waveform characteristics to fracture at least some of the water molecules into hydrogen H+ and oxygen O− ions. As such, the mark period 128D determines the electrolysis parameters and portion of ion control waveform 128C. Too much electrolysis produces gas bubbles, which can interfere with the inactivation pulse 130B. Too little electrolysis will not produce sufficient ions to change the pH of the liquid medium 154 surrounding the microorganism 208, which can negatively impact the log reduction of inactivated microorganisms 208. The ion control voltage +V 128 is typically of a sufficient voltage amplitude and at a sufficient electric current level as to be able to maintain an ionization threshold voltage +Vion 166 differential across the treatment chamber 148 during the electrolysis mark period 128D of the ion control waveform 128C. The voltage level across the treatment chamber 148 can be characterized by the ionization threshold voltage +Vion 166.

Furthermore, in an exemplary embodiment, the space period 128E determines the amount of time dedicated to allowing the freshly fractured hydrogen H+ and oxygen O− ions to reassemble and promote self ionization, forming at least additional hydronium ions H3O+ and hydroxide ions OH−, each of which improve the conductivity of the liquid medium 154, making electric current pass more easily through the liquid medium 154. This in turn improves the effectiveness of the inactivation pulse 130B resulting in a better log reduction of inactivate microorganisms 208. In addition, this space period 128E also allows time for the hydrogen H+ ions to migrate to the mostly negatively charged microorganism 208 protective cellular membrane, which stresses the microorganism 208 and changes the pH of the liquid medium 154 surrounding the microorganism 208, all of which is a precursor to the delivery of the inactivation pulse 130B, which can cause uncontrolled ion transport across the cellular membrane inactivating the microorganism 208.

If the space period 128E is not provided in the ion control waveform 128C, in effect allowing the mark period 128D to extend the entire length of the ion control waveform 128C more electrolysis will occur. Though more hydrogen H+ and oxygen O− ions will be produced the continually applied mark period 128D will cause the ions produced to be pulled to the electrodes 118 and 122 faster resulting in promoting less self ionization. This will form less hydronium ions H3O+ and hydroxide ions OH− and result in less hydrogen H+ ions being attracted to the negatively charged microorganism 208; all of which can negatively impacting log reduction of inactivated microorganisms 208.

Referring to the high voltage +HV 126 charge and discharge waveform, in this exemplary embodiment, to store the generated charge from the high voltage generator 164, a charging resistor 104 and charging capacitor 106 can be selected. The high voltage +HV 126 increases over time, the rate of which is based on a number of factors including the configuration of the high voltage generator 164, the charging resistor 104, and the charging capacitor 106. In operation, the charging portion of the waveform 126A can occur during the pulse pattern switching means 108 trough portions 128A, which can correspond to a period of time for generating ions, by way of the ion control means 114.

When the inactivation pulse 130B is delivered to liquid medium 152 and microorganism 208, the high voltage having the desired field strength and specific energy is discharged into the liquid medium 154 treatment sample. In operation, the +HV discharge waveform 126B can occur during the pulse pattern switching means 108 peak or mark portions 128B, which corresponds to a period of time for delivering the inactivation pulse 130B. In an exemplary embodiment, the +HV waveform 126, as illustrated in at least FIG. 11, can be configured to be repetitively occurring at least once each treatment cycle.

Noted here is that since there can be a switching time or turn 'ON' time associated with the pulse pattern switching means 108, in general, and the switching driver 110 and switch 112 specifically, as previously disclosed, the discharge waveform 126B may be shifted as to not occur exactly on the leading edge of the transition between the trough 128A and the peak 128B. This is illustrated in FIG. 11 as 126C.

In an exemplary embodiment, if the treatment chamber 148 with liquid medium 154 having resistance and capacitance 124, intensifier 168, frequencies associated with the ion control means 114 and pulse pattern switching means 108, as well as other consideration have been selected to create a resonating RLC circuit and treatment chamber 148, then the period of peak 128B and the location of the discharge wave 126B and associated inactivation pulse 130B occurrence, within that peak period 128B, should occur as early as possible. This will allow the RLC circuit to ring through several oscillations, damping out, and discharging all the inactivation pulse 130B energy into the liquid medium 154 treatment sample, within the treatment chamber 148, before the trailing or falling edge of the peak period 128B is reached and the treatment cycle restarts with the trough period 128A and ion generation.

The actual value of high voltage +HV 126, which in turn is the high voltage necessary to achieve the desired inactivate microorganism 208 log reduction, is guided by a number of design criteria. In this regard, the treatment chamber 148 design, the type of microorganisms 208 being inactivated, and the desired log reduction are three such design criteria. Furthermore, electrodes 118 and 122 material, separation, and surface area, as well as the liquid medium 154 and the conductivity of the liquid medium 154, as well as other factors, are all contributing factors that can influence the high voltage +HV 126 necessary to achieve the desired inactivated microorganisms 208 log reduction.

In an exemplary embodiment, informed by the charts of at least FIGS. 3A-3D and the characterization equations previously disclosed, high voltage +HV 126 is selected to generate an inactivation pulse 130B having a minimum field strength of 10 kV/cm across the treatment chamber 148 and having a minimum specific energy of 60 kJ/kg. The higher the better with the caveat that too high of a high voltage +HV 126 can create plasma streamers or electrical arcs across the treatment chamber 148 or treatment electrical circuit, which defeats the purpose and has a negative impact on treatment system 100 performance. Unnecessarily too high of a high voltage +HV 126 can also cause premature degradation of the electrodes 118 and or 122.

Referring to the treatment chamber waveform 130, in an exemplary embodiment, treatment chamber waveform 130 closely resembles a composite of the treatment cycle waveform 128 and in particular the ion control waveform 128C, referenced as treatment chamber 148 ion control waveform 130A, and the waveform starting at the peak or charged point of the high voltage +HV charge waveform 126A and continuing through the high voltage +HV discharge waveform 126B, referenced in FIG. 11 as the inactivation pulse 130B.

In an exemplary embodiment, +Vion 166 is the ionization threshold voltage corresponds to the amplitude of the ion control waveform 130A applied to the liquid medium 154 treatment sample. In this regard, this voltage can be monitored by chamber monitor 160 or by other means, as may be required in a particular embodiment. The ionization threshold voltage +Vion 166 measurement above a certain ionization threshold voltage indicates that a sufficient electrical field across the treatment chamber 148 is being produced and therefore a corresponding and sufficient number of ions are being generated within the liquid medium 154. Alternatively, a +Vion 166 measurement below a certain ionization threshold voltage can indicate that a sufficient electrical field across the treatment chamber 148 is not being produced and therefore a corresponding and sufficient number of ions are not being generated within the liquid medium 154.

In the case that the ionization threshold voltage +Vion 166 measurement is below a certain ionization threshold one solution could be to slow the flow rate through the treatment chamber 148 allowing for increased self ionization of the liquid medium 154. In this regard, allowing the ion control means 114 to increase self ionization of the liquid medium 154 and improve liquid medium 154 conductivity until the ionization threshold voltage +Vion 166 measurement meets or exceeds the desired ionization threshold voltage.

The optimum ionization threshold voltage can vary based on treatment chamber 148 design and other factors. In this regard, the ionization threshold voltage and thus a minimum ionization threshold voltage +Vion 166 needs to be determined in a manner to best insure the desired log reduction is achieved across variations of liquid mediums 154. As an example and not a limitation, in the case of the liquid medium 154 being water this might include testing a variety of water types, such as deionized water sources, pond water sources, and saline water sources to determine the optimum ionization threshold voltage +Vion 166.

In an exemplary embodiment, the +Vion 166 measurement is not only an indication of the ionization threshold voltage of the liquid medium 154 but also can be correlated to the effectiveness of the inactivation pulse 130B. In this regard, conductivity of the liquid medium 154 is related to the +Vion 166 measurement. As example, a measurement below the +Vion 166 ionization threshold voltage indicates that the conductivity of the liquid medium 154 is not optimized. As such, electric current through the liquid medium 154 is less then optimum and inactivation pulses 130B delivered, while the ionization threshold voltage +Vion 166 is below the desired ionization threshold are less likely to successfully inactivate the microorganism 208. In contrast, +Vion 166 measurements at or above the ionization threshold indicate that conductivity of the liquid medium 154 is optimized and as such electric current through the liquid medium 154 is optimum. In this case, the inactivation pulses 130B delivered while the ionization threshold voltage +Vion 166 meets or exceeds the ionization threshold are more likely to inactivate the microorganism 208, as intended.

As previously disclosed, field strength, often measured in kilovolts per centimeter (kV/cm), which is necessary to inactivate cells, has been conducted in numerous research studies. A prior art graph that summarizes the field strength necessary to inactivate certain pathogens is illustrated in FIG. 3A. This chart indicates generally that the greater the field strength the more likely the pathogens will be inactivated. In the present invention, minimum field strength of 10 kV/cm is can be selected to initiate meaningful cellular inactivation and a field strength approaching 100 kV/cm or more is preferred to insure inactivation of most species of cells. Noting here that microorganism 208 can be a single-cell or multi-cell organism. In this regard, +Vc is the field strength voltage of the inactivation pulse 130B generated by the high intensity pulse means 102.

In addition to field strength, another important parameter to consider is specific energy, often measured in kilo-Joules per kilogram {kJ/kg}. As with field strength, there have been numerous research studies which have sought to characterize log reduction versus specific energy. The prior art chart of FIG. 3B summarizes these research findings and indicates that liquid medium temperature and specific energy of a pulse necessary to inactivate a cell are related. In this regard, the cooler the liquid medium 154 temperature surrounding the microorganism the more specific energy is needed in the form of an inactivation pulse 130B, to achieve a larger log reduction. In an exemplary embodiment of the present invention, a specific energy greater than 60 kJ/kg can be necessary to initiate meaningful cellular inactivation (log reduction of 5 or 6 in hot liquid medium) and a specific energy approaching 100 kJ/kg or more is preferred to insure sufficient log reduction inactivating most species of cells. Again noting that microorganism 208 can be a single-cell or multi-cell organism.

Though in theory a single inactivation pulse 130B carefully designed having sufficient field strength and specific energy is all that is needed to inactivate a microorganism 208, in practice variations of the electrodes 118 and 122, particulates in the liquid medium 154 that may temporarily hide the microorganism 208 from the inactivation pulse 130B, orientation of the microorganism to the electric or magnetic field as well as the inactivation pulse 130B, ion concentration level, and numerous other factors all necessitate some reasonable repetitive number of treatment cycles to insure the desired log reduction is achieved.

The treatment system can further comprise a pulse pattern switching means 108 for creating a treatment cycle 128, which comprises repeatedly alternating between generating ions, by way of the ion control means 114 and delivering the inactivation pulse 130B, by way of the high intensity pulse means 102. Note in this exemplary embodiment, that the waveforms 126, 128, and 130 of at least FIG. 11 illustrate four complete treatment cycles. This is an example and not a limitation, in this regard, other treatment cycles can be constructed, as may be required and or desired in this particular embodiment.

Figure 12:
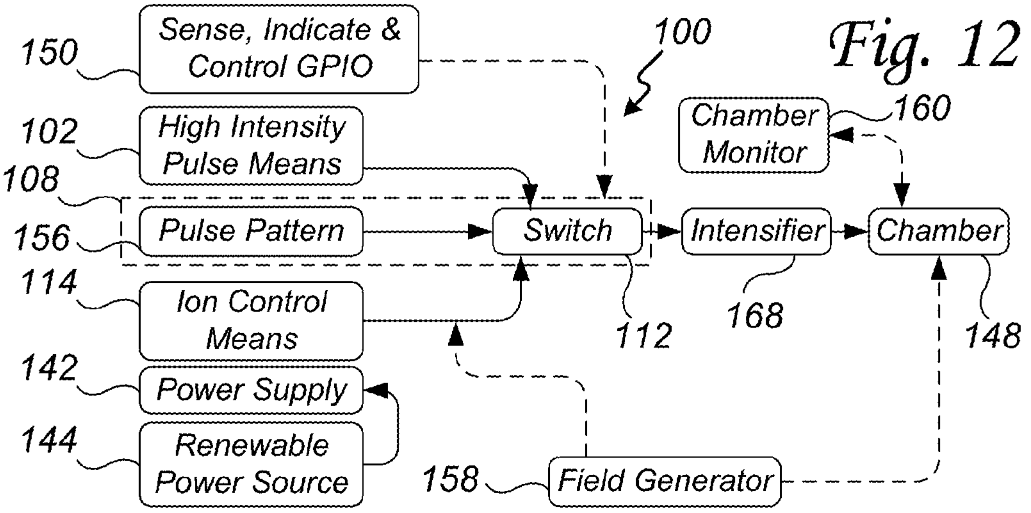
FIG. 12 illustrates one example of a treatment system block diagram.

Referring to FIG. 12 there is illustrated one example of a treatment system 100 block diagram. In an exemplary embodiment, in addition to the functionality of treatment system 100 already disclosed other functions can selectively be implemented to provide additional sensing, control, user interface, indicia, and for other reasons, as may be required and or desired in a particular embodiment.

For example and not a limitation, a sense, indicate and control general purpose input and output (GPIO) 150, also referred to as GPIO 150, can be implemented to provide sensing, indicating, and control means to the treatment system 100. Such sensing can include detecting the presence of liquid and automatically starting or stopping the treatment cycles and methods, as necessary. Such GPIO 150 can be operationally related to the intensity pulse means 108, the pulse pattern generator 156, the switching device 112, or operationally related in other ways to the treatment system 100, as may be required and or desired in a particular embodiment.

In an exemplary embodiment, the GPIO 150 can be utilized to monitor treatment system performance and provide indicators such as lights or actions, such as controlling flow rate, or stopping a process, displaying a condition light, providing status, or other indicators or actions, as may be required and or desired in a particular embodiment. In this regard, the GPIO 150 could measure the +Vion 166 ionization threshold voltage to determine if it is above or below a preset ionization threshold voltage. Proper indication or action can then be indicated or taken respectively.

Furthermore, in an exemplary embodiment, the GPIO 150 can be utilized to implement a flow sensor which can detect flows into the treatment chamber and initiate the treatment cycle.

In an exemplary embodiment, a power supply 142 can be utilized to provide power to the treatment system 100. In this regard, the power supply 142 can be a battery, storage capacitor, fuel cell, other portable power source, powered by a line source or power transformer of power (alternating current (AC) or direct current (DC)), a combination of different types or kinds of power sources, and or other power sources, as may be required and or desired in a particular embodiment. Furthermore, a renewable power source 144 such as solar power, or other renewable power source can be used in combination with the power supply 142, as may be required and or desired in a particular embodiment, to provide renewable energy to operate the treatment system 100. In this regard, a renewable power source can be operationally coupled to operate at least a portion of the improved treatment system.

Figure 13:
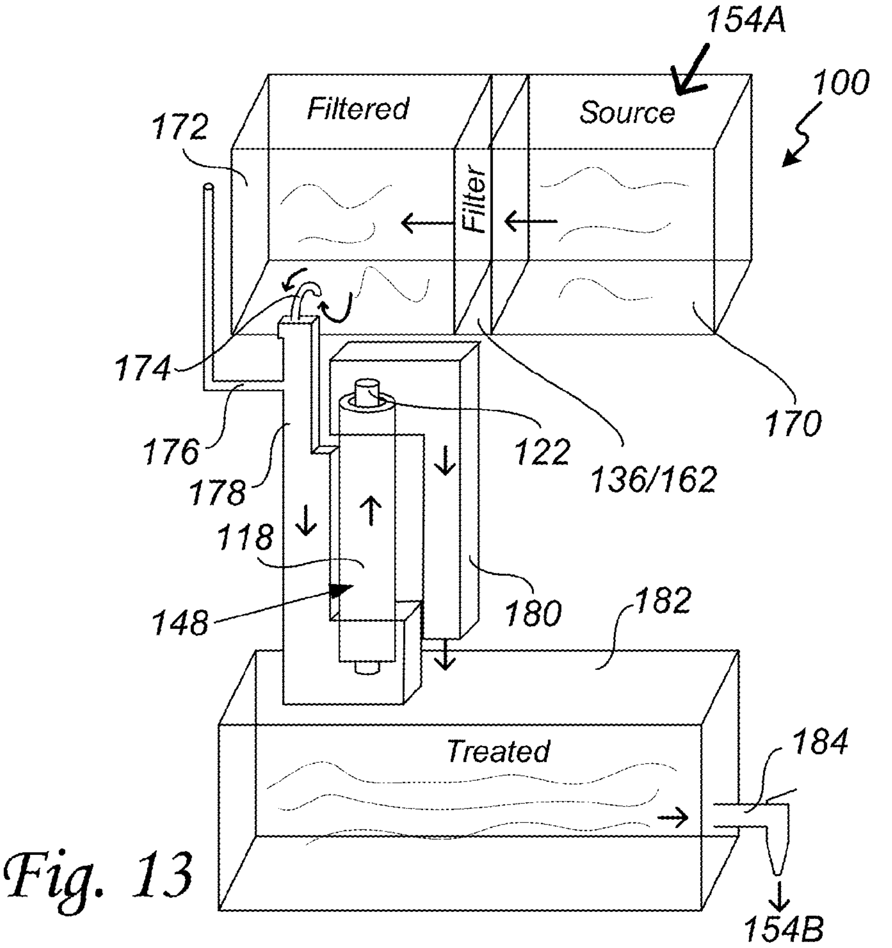
FIG. 13 illustrates one example of a treatment system functional diagram.

Referring to FIG. 13 there is illustrated one example of a system 100 functional diagram. FIG. 13 illustrates, an exemplary embodiment, for example and not a limitation, of one method by which liquid medium 154 can be treated and dispensed for use. For purposes of disclosure liquid medium 154A is untreated source liquid medium, such as from a pond, stream, or other untreated source and liquid medium 154B is treated liquid medium after passing through at least the treatment chamber. The treatment chamber 148 comprises rod 122 inside of tube 118 configured as electrodes, as illustrated in at least FIGS. 4, 8, and 9. The arrows in FIG. 13 indicate the flow direction of the liquid medium 154A and 154B through the system 100.

Such a system as illustrated in FIG. 13 can be a low cost cup, pitcher, canteen, sports vessel, reusable bottle, mobile or stationary system, small or large capacity, or other types and kinds of vessel and or source liquid medium processing system in which source liquid medium, such as water and or other source medium can be added to the source reservoir 170 and be allowed to flow through the system, ultimately being dispensed as treated liquid medium through valve 184. In operation, source liquid medium 154 can be added to reservoir 170. Gravity and or optional pump pressure can cause the liquid medium to move through special purpose filter 136 and particulate filters 162. Once filtered, the liquid medium collects in a filtered reservoir 172. An inverted tube 174 can establish a controlled flow rate from the filtered reservoir into a transport chamber 178. A tube open to air 176 can minimize cavitation effects, within the transport chamber 178. The transport chamber 178 directs the liquid medium to the bottom of a vertical treatment chamber, which is comprised of a rod 122 inside a tube 118 configured as electrodes. In this embodiment, gravity and siphon pressure can move the liquid medium up through the treatment chamber, treating the liquid medium, as taught in the present invention. Filling the treatment chamber from the bottom can better insure even flow into and through the treatment chamber, as compared to top filling of the treatment chamber, in which the liquid medium could find a path of least resistance through the chamber and form a small stream flow potentially reducing the effectiveness of the treatment. The treated liquid medium is then directed into an egress tube 180. The egress tube 180 guides the treated liquid medium into a treated reservoir 182. The treated liquid medium 154B can then be dispensed, as need, through a valve 184.

Figure 14:
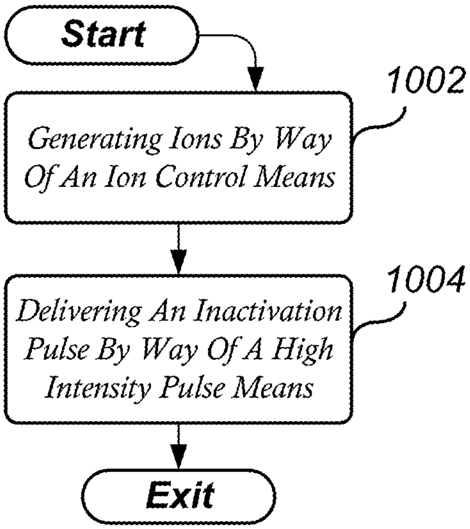
FIGS. 14-15 illustrate one example of an improved treatment method for inactivating microorganisms.

Referring to FIG. 14 there is illustrated one example of an improved treatment method for inactivating microorganisms 208. In an exemplary embodiment, for example and not a limitation, the method begins in block 1002.

In block 1002 ions are generated by way of an ion control means, ion generation can compensate for conductivity variations in a liquid medium surrounding a microorganism and increases the microorganism susceptibility to inactivation by an inactivation pulse.

In an exemplary embodiment, an ion control means 114 generates ions, wherein ion generation can compensate for conductivity variations in a liquid medium 154 surrounding the microorganism 208 and increases the microorganism susceptibility to inactivation, by way of the inactivation pulse. The method then moves to block 1004.

In block 1004 the inactivation pulse 130B is delivered, by way of a high intensity pulse means 102, inactivating the microorganism 208. The method is then exited.

Figure 15:
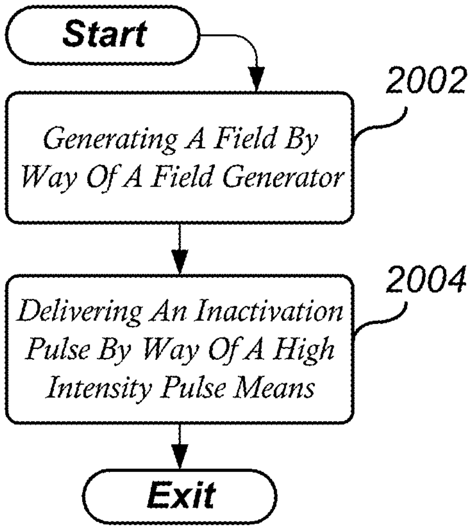

Referring to FIG. 15 there is illustrated one example of an improved treatment method for inactivating microorganisms 208. In an exemplary embodiment, for example and not a limitation, the method begins in block 2002.

In block 2002 a field generator generates a field that encompasses the microorganism diminishing the ability of the microorganism to regulate proper cellular function. A field generated by field generator 158 can be an electric field, magnetic field, other field, or a combination of an electric field and a magnetic field to be utilized to disrupt microorganism cellular function, orientate liquid medium molecules and or fracture the water molecules 202B, as the water molecules enter the treatment chamber 148.

In an exemplary embodiment, an ion control means 114 generates ions, wherein ion generation can compensate for conductivity variations in a liquid medium 154 surrounding the microorganism 208 and increases the microorganism susceptibility to inactivation, by way of the inactivation pulse. The method then moves to block 2004.

In block 2004 the inactivation pulse 130B is delivered, by way of a high intensity pulse means 102, inactivating the microorganism 208. The method is then exited.

Figure 16:
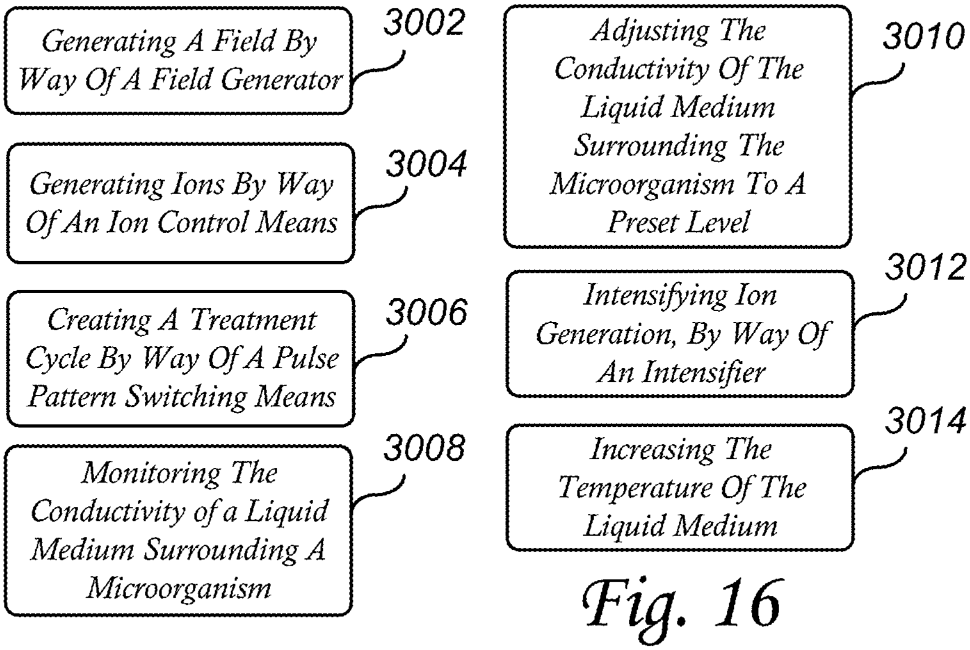
FIG. 16 illustrates exemplary embodiments of an improved treatment method for inactivating microorganisms.

Referring to FIG. 16, there are also illustrated exemplary embodiments of an improved treatment method for inactivating microorganisms 208. Such exemplary embodiments illustrated below can be selectively utilized with the methods of the present invention.

In block 3002 a field generator generates a field that encompasses the microorganism diminishing the ability of the microorganism to regulate proper cellular function. A field generated by field generator 158 can be an electric field, magnetic field, other field, or a combination of an electric field and a magnetic field to be utilized to disrupt microorganism cellular function, orientate liquid medium molecules and or fracture the water molecules 202B, as the water molecules enter the treatment chamber 148.

In block 3004 ions are generated by way of an ion control means, ion generation can compensate for conductivity variations in a liquid medium surrounding a microorganism and increases the microorganism susceptibility to inactivation by an inactivation pulse.

In block 3006 a treatment cycle is created, by way of a pulse pattern switching means, the treatment cycle comprising repeatedly alternating between generating ions, by way of the ion control means and delivering the inactivation pulse, by way of the high intensity pulse means.

In block 3008 the conductivity of the liquid medium 154 surrounding the microorganism can be monitored. In this regard, a chamber monitor 160 can be operationally coupled with the ion control means 114, the treatment chamber 148, and or operationally related to the treatment system 100 in other ways, as may be required and or desired in a particular embodiment, to determine directly or indirectly the conductivity of the liquid medium 154. One such method of monitoring conductivity of the liquid medium 154 indirectly can include measuring the ionization threshold voltage +Vion 166, as illustrated in at least FIG. 11, generated between the electrodes 118 and 122. In an exemplary embodiment, feedback from the measurements, direct or indirect, in a closed loop fashion, can be used to change the attributes and characteristics of the treatment system 100, and or the ion control waveform 128C including varying frequency, wave shape, amplitude, electric current supply, mark period 128D, space period 128E as illustrated in at least FIG. 11, and or other attributes and characteristics, as may be required and or desired in a particular embodiment, to maintain the desired treatment system 100 performance level.

In another exemplary embodiment, a chamber monitor 160 can monitor electric current flow through the treatment chamber 148 and or ionization threshold voltage +Vion 166 across the treatment chamber 148 and provide a feedback signal to make adjustments in the treatment method, if necessary, to stay within desired specifications. Alternatively, other chamber monitor 160 methods can be employed, as may be required and or desired in a particular embodiment.

In block 3010 the conductivity of the liquid medium 154 surrounding the microorganism can be adjusted to a preset level. Such a preset level can be the ionization threshold voltage +Vion 166 level or other preset level. In an exemplary embodiment, +Vion 166 is the ionization threshold voltage and corresponds to the amplitude of the ion control waveform 130A applied to the liquid medium 154 treatment sample. In this regard, this voltage can be monitored by chamber monitor 160 or by other means, as may be required or desired in a particular embodiment. The ionization threshold voltage +Vion 166 measurement above a certain ionization threshold voltage indicates that a sufficient electrical field across the treatment chamber 148 is being produced and therefore a corresponding and sufficient number of ions are being generated within the liquid medium 154. Alternatively, a +Vion 166 measurement below a certain ionization threshold voltage can indicate that a sufficient electrical field across the treatment chamber 148 is not being produced and therefore a corresponding and sufficient number of ions are not being generated within the liquid medium 154.

In the case that the ionization threshold voltage +Vion 166 measurement is below a certain ionization threshold one solution could be to slow the flow rate through the treatment chamber 148 allowing for increased self ionization of the liquid medium 154. In this regard, allowing the ion control means 114 to increase self ionization of the liquid medium 154 and improve liquid medium 154 conductivity until the ionization threshold voltage +Vion 166 measurement meets or exceeds the desired ionization threshold voltage.

In block 3012 the intensifier 168 can intensify ion generation. In an exemplary embodiment, the intensifier 168 can comprise inductors 116 and 120 to intensify at least the ion generation portion of the treatment cycle. In this regard, one way in which the intensifier 168 intensifies ion generation is by operating the treatment chamber with intensifying inductors 116 and 120 at resonate frequencies with the pulse pattern switching means 108 generated treatment cycle waveform 128 and or ion control waveform 128C. Another way in which the intensifier 168 intensifies ion generation can be by storing energy during a portion of the waveform 128 and or ion control waveform 128C and then releasing it back into the treatment chamber 148 during other portions of the generated waveform 128.

In block 3014 the temperature of the liquid medium is increased. An advantage in the present invention is that as energy is transferred to the liquid medium 154 during treatment by way of at least treatment waveform 130, which comprises the ion generation period and the inactivation pulse period, the liquid medium 154 and the microorganism 208, within the liquid medium 154, warms making it easier to inactivate the microorganism 208. In this regard, the longer the energy from the treatment waveform 130 is applied to the liquid medium 154 the warmer the liquid medium 154 and the microorganism 208, within the liquid medium, gets. Correspondingly, referring to the chart of FIG. 3B the warmer the liquid medium 154 the less amount of specific energy is required to inactivate the microorganism 208.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An improved treatment system for inactivating microorganisms comprising:

a plurality of electrodes;

a treatment chamber, the plurality of electrodes are arranged and spaced forming the treatment chamber therebetween, the treatment chamber receives a microorganism and a liquid medium surrounding the microorganism, the microorganism further comprising an exterior cellular membrane;

a high intensity pulse means generates an inactivation pulse having a specific energy of at least 60 kJ/kg and a field strength of at least 10 kV/cm;

an ion control means generates an ion control waveform, the ion control waveform further comprising alternating between a +Vion period which creates ions in the liquid medium and a space period void of ion generation; and a pulse pattern switching means generates a treatment cycle waveform, the treatment cycle waveform further comprising alternating between:

a trough period where the ion control waveform is coupled to the plurality of electrodes and repeatedly applied to the liquid medium generating a plurality of ions therein; and a peak period where the high intensity pulse means is coupled to the plurality of electrodes and the inactivation pulse is delivered to the microorganism through the liquid medium;

wherein certain of the plurality of ions are attracted to and concentrate proximate the exterior cellular membrane of the microorganism increasing the microorganism susceptibility to inactivation by the inactivation pulse.

2. The improved treatment system in accordance with claim 1, further comprising:

a magnetic field that encompasses the microorganism and the liquid medium surrounding the microorganism, the magnetic field being of sufficient strength to diminish ability of the microorganism to regulate proper cellular function.

3. The improved treatment system in accordance with claim 1, further comprising:

an intensifier receives the ion control waveform and intensifies ion generation, the intensifier is operationally coupled to the plurality of electrodes.

4. The improved treatment system in accordance with claim 1, further comprising:

a flow sensor which detects flow of the liquid medium into the treatment chamber and initiates at least the treatment cycle waveform.

5. The improved treatment system in accordance with claim 1, the plurality of electrodes further comprising:

a rod further defining an outside surface; and a tube further defining an inner surface, the rod is fitted inside the tube forming the treatment chamber between the outside surface of the rod and the inner surface of the tube.

6. The improved treatment system in accordance with claim 5, the rod further comprising:

at least one of an insulator, positioned around circumference of the rod, the rod and the tube are coaxially arranged, the insulator maintains equidistance separation between the outside surface of the rod and the inner surface of the tube.

7. The improved treatment system in accordance with claim 6, at least a portion of the insulator being positioned at an angle with respect to center axis of the rod and to flow of the liquid medium through the treatment chamber, wherein the insulator positioned at the angle changes flow direction causing agitation of the liquid medium and the microorganism therein and extends path length for the liquid medium to travel through the treatment chamber.

8. The improved treatment system in accordance with claim 1, further comprising:

a renewable power source operationally coupled to operate at least a portion of the improved treatment system.

9. An improved treatment system for inactivating microorganisms comprising:

a plurality of electrodes;

a treatment chamber, the plurality of electrodes are arranged and spaced forming the treatment chamber therebetween, the treatment chamber receives a microorganism and a liquid medium surrounding the microorganism, the microorganism further comprising an exterior cellular membrane;

a high intensity pulse means generates an inactivation pulse having a specific energy of at least 60 kJ/kg and a field strength of at least 10 kV/cm;

a magnetic field encompasses the microorganism and the liquid medium surrounding the microorganism; and a pulse pattern switching means generates a treatment cycle waveform, the treatment cycle waveform further comprising alternating between:

a trough period; and a peak period where the high intensity pulse means is coupled to the plurality of electrodes and the inactivation pulse is delivered to the microorganism through the liquid medium;

wherein the magnetic field causes biological stress to the microorganism, diminishing ability of the microorganism to regulate proper cellular function increasing the microorganism susceptibility to inactivation by the inactivation pulse.

10. The improved treatment system in accordance with claim 9, further comprising:

an ion control means for generating ions within the liquid medium surrounding a microorganism, the ion control means generates an ion control waveform, the ion control waveform further comprising alternating between a +Vion period which creates ions in the liquid medium and a space period void of ion generation, the ion control waveform is coupled to the plurality of electrodes during the trough period and repeatedly applied to the liquid medium generating a plurality of ions therein;

wherein ion generation compensates for conductivity variations in the liquid medium surrounding the microorganism, changes pH of the liquid medium resulting in biological stress to the microorganism, and causes certain of the plurality of ions to be attracted to and concentrate proximate the microorganism exterior cellular membrane increasing the microorganism susceptibility to inactivation, by way of the inactivation pulse.

11. The improved treatment system in accordance with claim 10, further comprising:

an intensifier receives the ion control waveform and intensifies ion generation, the intensifier is operationally coupled to the plurality of electrodes.

12. The improved treatment system in accordance with claim 9, the plurality of electrodes further comprising:

a rod further defining an outside surface; and a tube further defining an inner surface, the rod is fitted inside the tube forming the treatment chamber between the outside surface of the rod and the inner surface of the tube.

13. The improved treatment system in accordance with claim 12, further comprising:

at least one of an insulator, positioned around circumference of the rod, the rod and the tube are coaxially arranged, the insulator maintains equidistance separation between the outside surface of the rod and the inner surface of the tube.

14. The improved treatment system in accordance with claim 13, at least a portion of the insulator being positioned at an angle with respect to center axis of the rod and to flow of the liquid medium through the treatment chamber, wherein the insulator positioned at the angle changes flow direction causing agitation of the liquid medium and the microorganism therein and extends path length for the liquid medium to travel through the treatment chamber.

15. An improved treatment method for inactivating microorganisms, the method comprising the steps of:

receiving a microorganism and a liquid medium surrounding the microorganism in a treatment chamber, a plurality of electrodes are arranged and spaced forming the treatment chamber therebetween, the microorganism further comprising an exterior cellular membrane;

generating an ion control waveform and an inactivation pulse, an ion control means generates the ion control waveform, the ion control waveform further comprising alternating between a +Vion period which creates ions in the pulse means generates the inactivation pulse having a specific energy of at least 60 kJ/kg and a field strength of at least 10 kV/cm; and delivering the inactivation pulse to the microorganism through the liquid medium, a pulse pattern switching means generates a treatment cycle waveform, the treatment cycle waveform further comprising alternating between a trough period where the ion control waveform is coupled to the plurality of electrodes and repeatedly applied to the liquid medium generating a plurality of ions therein and a peak period where the high intensity pulse means is coupled to the plurality of electrodes and the inactivation pulse delivered;

wherein certain of the plurality of ions are attracted to and concentrate proximate the exterior cellular membrane of the microorganism increasing the microorganism susceptibility to inactivation by the inactivation pulse.

16. The improved treatment method in accordance with claim 15, further comprising:

generating a magnetic field that encompasses the microorganism and the liquid medium surrounding the microorganism, the magnetic field being of sufficient strength to diminish ability of the microorganism to regulate proper cellular function.

17. The improved treatment method in accordance with claim 15, further comprising:

intensifying ion generation by way of an intensifier, the intensifier receives the ion control waveform and is operationally coupled to the plurality of electrodes.

* * * * *